(12) United States Patent
Memari et al.

(10) Patent No.: US 12,091,857 B2
(45) Date of Patent: Sep. 17, 2024

(54) THREE-DIMENSIONAL PRINTING OF CEMENTITIOUS COMPOSITIONS

(71) Applicant: THE PENN STATE RESEARCH FOUNDATION, University Park, PA (US)

(72) Inventors: Ali M. Memari, State College, PA (US); Maryam Hojati, Albuquerque, NM (US); Jose Manuel Pinto Duarte, Boalsburg, PA (US); Shadi Nazarian, State College, PA (US); Aleksandra Radlinska, Lemont, PA (US); Sven Bilen, State College, PA (US); Nicholas Meisel, State College, PA (US)

(73) Assignee: THE PENN STATE RESEARCH FOUNDATION, University Park, PA (US)

( * ) Notice: Subject to any disclaimer, the term of this patent is extended or adjusted under 35 U.S.C. 154(b) by 343 days.

(21) Appl. No.: 17/353,628

(22) Filed: Jun. 21, 2021

(65) Prior Publication Data
US 2021/0395149 A1    Dec. 23, 2021

Related U.S. Application Data

(60) Provisional application No. 63/041,394, filed on Jun. 19, 2020, provisional application No. 63/041,351, filed on Jun. 19, 2020.

(51) Int. Cl.
| | |
|---|---|
| *E04C 5/01* | (2006.01) |
| *B21F 45/00* | (2006.01) |
| *B28B 1/00* | (2006.01) |
| *B33Y 10/00* | (2015.01) |
| *B33Y 70/00* | (2020.01) |
| *B33Y 80/00* | (2015.01) |
| *C04B 14/10* | (2006.01) |
| *C04B 14/14* | (2006.01) |
| *C04B 18/14* | (2006.01) |
| *C04B 22/12* | (2006.01) |
| *C04B 28/04* | (2006.01) |
| *C04B 103/10* | (2006.01) |
| *C04B 103/30* | (2006.01) |
| *C04B 103/32* | (2006.01) |
| *C04B 111/00* | (2006.01) |

(52) U.S. Cl.
CPC ............ *E04C 5/012* (2013.01); *B21F 45/006* (2013.01); *B33Y 70/00* (2014.12); *B33Y 80/00* (2014.12); *C04B 14/104* (2013.01); *C04B 14/106* (2013.01); *C04B 14/14* (2013.01); *C04B 18/141* (2013.01); *C04B 18/146* (2013.01); *C04B 22/124* (2013.01); *C04B 28/04* (2013.01); *B28B 1/001* (2013.01); *B33Y 10/00* (2014.12); *C04B 2103/10* (2013.01); *C04B 2103/302* (2013.01); *C04B 2103/32* (2013.01); *C04B 2111/00181* (2013.01)

(58) Field of Classification Search
CPC ..... C04B 14/104; C04B 14/106; C04B 14/14; C04B 18/141; C04B 18/146; C04B 22/124; C04B 28/04; C04B 2103/10; C04B 2103/302; C04B 2103/32; C04B 2111/00181; B21F 45/006; B28B 1/001; B33Y 70/00; B33Y 80/00; B33Y 10/00; E04C 5/012; Y02W 30/91
See application file for complete search history.

(56) References Cited

U.S. PATENT DOCUMENTS 9,416,052 B2 *   8/2016   Feldman ................. C04B 28/10

OTHER PUBLICATIONS

Bos et al., Additive Manufacturing of Concrete in Construction: Potentials and Challenges of 3D Concrete Printing, Virtual and Physical Prototyping, 2016, 11(3):209-225.
Buswell et al., 3D Printing Using Concrete Extrusion: A Roadmap for Research, Cement and Concrete Research, 2018, 112:37-49.
Cox et al., Expedient Reinforcement for Concrete for Use in Southeast Asia, Report 2—Preliminary Tests of Barbed Wire, Concertina Wire, Wire Rope, Landing Mat, and Landing Mat Tie Bars, Mar. 1970, 114 pages.
Hack et al., Mesh-Mould: Robotically Fabricated Spatial Meshes as Reinforced Concrete Formwork, Architectural Design, 2014, 84(3):44-53.
Hambach et al., Properties of 3D-Printed Fiber-Reinforced Portland Cement Paste, Cement and Concrete Composites, 2017, 79:62-70.
Har-Tru Sports, Har-Tru Safety Data Sheet, Mar. 27, 2015, 5 pages.
Hwang et al., An Innovative Construction Process-Contour Crafting (CC), in 22nd International Symposium on Automation and Robotics in Construction, vol. 90111, ISARC, 2005, 6 pages.
Jutinov, 3D Concrete Printing, Research and Development of a Structural Reinforcement System for 3D Printing with Concrete, Graduation Thesis, Eindhoven University of Technology, 2017, 110 pages.
Kazemian et al., Cementitious Materials for Construction-Scale 3D Printing: Laboratory Testing of Fresh Printing Mixture, Construction and Building Materials, 2017, 145:639-647.
Khoshnevis, Automated Construction by Contour Crafting-Related Robotics and Information Technologies, Automation in Construction, 2004, 13(1):5-19.
Le et al., Mix Design and Fresh Properties for High-Performance Printing Concrete, Materials and Structures, 2012, 45(8):1221-1232.
Im et al., Developments in Construction-Scale Additive Manufacturing Processes, Automation in Construction, 2012, 21:262-268.
Slager, Influence of the Interface Between Layers on the Tensile Properties of 3D-Printed Concrete, Graduation Thesis, 2017, Eindhoven University of Technology, 2017, 166 pages.

(Continued)

*Primary Examiner* — Anthony J Green
(74) *Attorney, Agent, or Firm* — Quarles & Brady LLP

(57) ABSTRACT

Embodiments of the disclosure provide a printable cementitious composition comprising a cement binder, an aggregate, at least one pozzolanic additive, an accelerator, water, and nanoclay.

20 Claims, 17 Drawing Sheets
(17 of 17 Drawing Sheet(s) Filed in Color)

(56) References Cited

OTHER PUBLICATIONS

Tay et al., 3D Printing Trends in Building and Construction Industry: A Review, Virtual and Physical Prototyping, 2017, 12(3):261-276.
Tilcon, Material Safety Data Sheet—Crushed Stone, Sep. 2003, 6 pages.
Van Den Bulck, Assembling Structural 3D Concrete Printed Elements, Master Thesis, Eindhoven University of Technology, 2017 104 pages.
Van Zijl et al., Properties of 3D Printable Concrete, in Proceedings of the 2nd International Conference on Progress in Additive Manufacturing, 2016, pp. 421-426.
Wu et al., A Critical Review of the Use of 3-D Printing in the Construction Industry, Automation in Construction, 2016, 68:21-31.

\* cited by examiner

M14

M16

M22

M24

S51: Plain

Reinforced
S55: 3R3C

Sliced Specimen

Sliced specimen (V//)

(H//)

THREE-DIMENSIONAL PRINTING OF CEMENTITIOUS COMPOSITIONS

CROSS-REFERENCE TO RELATED APPLICATION

This application claims priority under 35 U.S.C. § 119 to U.S. Provisional Application No. 63/041,394 filed Jun. 19, 2020 and to U.S. Provisional Application No. 63/041,351 filed Jun. 19, 2020, the entire contents of which are incorporated herein by reference.

STATEMENT CONCERNING FEDERALLY SPONSORED RESEARCH OR DEVELOPMENT

Not applicable.

FIELD OF THE INVENTION

This disclosure relates to three-dimensional printing of cementitious compositions.

BACKGROUND

Concrete is the most frequently used building material on the earth. One virtue of concrete is its ability to be molded into shapes for various structural forms, such as beams, slabs, columns, walls, bases and foundations. Concrete structures are typically formed by constructing a mold or "form" that houses the fresh (pre-set) concrete. The fresh concrete is then poured into the mold and allowed to cure until the concrete sets. The mold is then removed, and the cured concrete retains the shape of the mold. Molds are typically made from timber, steel, plastic, rubber, and/or fiberglass.

A new paradigm of forming concrete structures is emerging using three-dimensional printing without the use of forms or molds. Conventional concrete mixtures do not possess suitable material buildability for three-dimensional printing. That is, conventional concrete mixtures do not have enough time to gain strength and reach the structuration phase during fast deposition rates of three-dimensional printing, resulting in strength-based failure (e.g., collapse) caused by low yield stress, low structuration rate, loss of stability, and/or buckling, if mold is not used.

The art recognizes a need for concrete mixtures that are suitable for three-dimensional printing, where the mixtures retain suitable structuration rates and yield stresses to resist buckling and collapsing during deposition.

SUMMARY OF THE INVENTION

Embodiments of the disclosure provide a printable cementitious composition comprising a cement binder, an aggregate, at least one pozzolanic additive, an accelerator, water, and nanoclay.

In some embodiments, the printable cementitious composition comprises from 15 wt % to 40 wt % of the cement binder, based on the total weight of the printable cementitious composition. In some embodiments, the cement binder is ordinary portland cement.

In some embodiments, the printable cementitious composition comprises from 35 wt % to 60 wt % of the aggregate, based on the total weight of the printable cementitious composition.

In some embodiments, the aggregate has a particle size of less than 2.0 mm. In some embodiments, the aggregate has a particle size from 0.01 mm to 1 mm.

In some embodiments, the printable cementitious composition comprises from 3 wt % to 20 wt % of the at least one pozzolanic additive, based on the total weight of the printable cementitious composition. In some embodiments, the at least one pozzolanic additive includes from 0.5 wt % to 5 wt % silica fume, based on the total weight of the printable composition; from 1 wt % to 20 wt % slag, based on the total weight of the printable composition; and from 0.5 wt % to 6 wt % metakaolin, based on the total weight of the printable composition.

In some embodiments, the printable cementitious composition comprises from 0.1 wt % to 1.5 wt % of the accelerator, based on the total weight of the printable composition. In some embodiments, the accelerator is selected from the group consisting of calcium chloride, sodium metasilicate, and combinations thereof.

In some embodiments, the printable cementitious composition further includes a water-reducing agent. In some embodiments, the printable cementitious composition includes from 0.01 wt % to 1 wt % of the water-reducing agent, based on the total weight of the printable composition.

In some embodiments, the printable cementitious composition comprises from 5 wt % to 20 wt % water, based on the total weight of the printable composition.

In some embodiments, the printable cementitious composition comprises from 0.01 wt % to 5 wt % nanoclay, based on the total weight of the printable composition. In some embodiments, the nanoclay is selected from the group consisting of montmorillonite, bentonite, kaolinite, hectorite, and hallysite.

In some embodiments, the printable composition has one or more of the following properties: (a) a flow table test from 15 cm to 20 cm; (b) an initial set time from 50 to 180 minutes; (c) a final set time from 80 to 300 minutes; (d) a fresh density from 2.0 to 2.4 g/cm3; (e) a 2-day strength from 10 MPa to 55 MPa; or (f) a 28-day strength from 25 MPa to 85 MPa.

In some embodiments, the printable composition comprises (i) from 20 wt % to 40 wt % of a cement binder; (ii) from 30 wt % to 50 wt % of an aggregate; (iii) from 5 wt % to 15 wt % of at least one pozzolanic additive; (iv) from 0.1 wt % to 1.5 wt % of an accelerator; (v) from 0.0 wt % to 1.0 wt % of water reducing admixture; (vi) from 10 wt % to 20 wt % of water; and (vii) from 0.01 wt % to 2 wt % of a nanoclay. In some embodiments, the aggregate is a basalt, the at least one pozzolanic additive comprises silica fume and slag, and the accelerator is sodium metasilicate.

In some embodiments, the present disclosure provides a method. The method includes (i) depositing a first filament of a cementitious material on a printing surface from a nozzle of a print head, where the cementitious material comprises a cement binder, an aggregate, at least one pozzolanic additive, an accelerator, water, and nanoclay. The method further includes (ii) depositing at least one additional filament of the cementitious material atop the first filament thereby forming a three-dimensional structure.

In some embodiments, the step of depositing the first filament on the printing surface is continuous so that a non-interrupted printing of the cementitious material forms along a path defined by movement of the print head.

In some embodiments, the method includes depositing the first filament and/or the at least one additional filament on a curved printing surface.

In some embodiments, the method includes depositing the first filament and the at least one additional filament on the printing surface, where the first filament and the at least one additional filament are substantially free of cracks on the outer surface of the filament for at least one day to one week following deposition.

In some embodiments, the method includes depositing a printable cementitious composition comprising from 15 wt % to 40 wt % of the cement binder, based on the total weight of the printable cementitious composition.

In some embodiments, the method includes depositing a printable cementitious composition comprising from 35 wt % to 60 wt % of the aggregate, based on the total weight of the printable cementitious composition.

In some embodiments, the method includes depositing a printable cementitious compositing comprising from 3 wt % to 20 wt % of the at least one pozzolanic additive, based on the total weight of the printable cementitious composition. In some embodiments, the method includes depositing a printing composition at least one pozzolanic additive that includes from 0.5 wt % to 5 wt % silica fume, based on the total weight of the printable composition; from 1 wt % to 20 wt % slag, based on the total weight of the printable composition; and from 0.5 wt % to 6 wt % metakaolin, based on the total weight of the printable composition.

In some embodiments, the method includes depositing a printable cementitious composition comprising from 0.1 wt % to 1.5 wt % of the accelerator, based on the total weight of the printable composition.

In some embodiments, the method includes depositing a printable cementitious compositing comprising a water-reducing agent. In some embodiments, the method includes depositing a printable cementitious compositing comprising from 0.01 wt % to 1 wt % of the water-reducing agent, based on the total weight of the printable composition.

In some embodiments, the method includes depositing a printable cementitious composition comprising from 5 wt % to 20 wt % water, based on the total weight of the printable composition.

In some embodiments, the method includes depositing a printable cementitious composition comprising from 0.01 wt % to 5 wt % nanoclay, based on the total weight of the printable composition.

In some embodiments, the method includes contacting a reinforcement member to a surface of the first filament of the cementitious material prior to depositing the at least one additional filament.

In some embodiments, the method includes contacting a reinforcement member to a surface of the first filament of the cementitious material concurrently with depositing the at least one additional filament.

These and other advantages and features of the invention will become more apparent from the following detailed description of the preferred embodiments of the invention when viewed in conjunction with the accompanying drawings.

DESCRIPTION OF THE DRAWINGS

The patent or application file contains at least one drawing executed in color. Copies of this patent or patent application publication with color drawing(s) will be provided by the Office upon request and payment of the necessary fee.

two repetition testing result of H12 sample with PSU material (left) and three repetitions testing result of H23 sample with GCT material (right).

Figure 54:
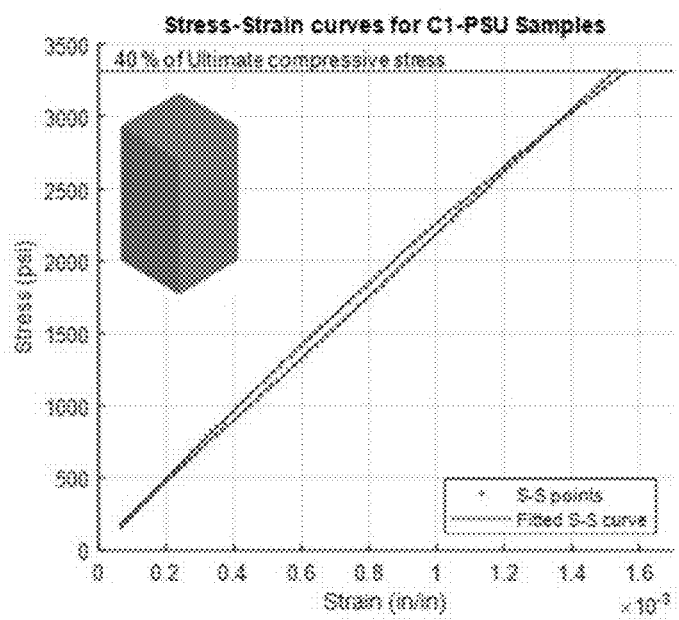

FIG. 54 illustrates a graph of regressed stress-strain curves plotted up to the elastic range (40% of ultimate strength); two repetitions testing result of C1 sample with PSU material.

Figure 55:
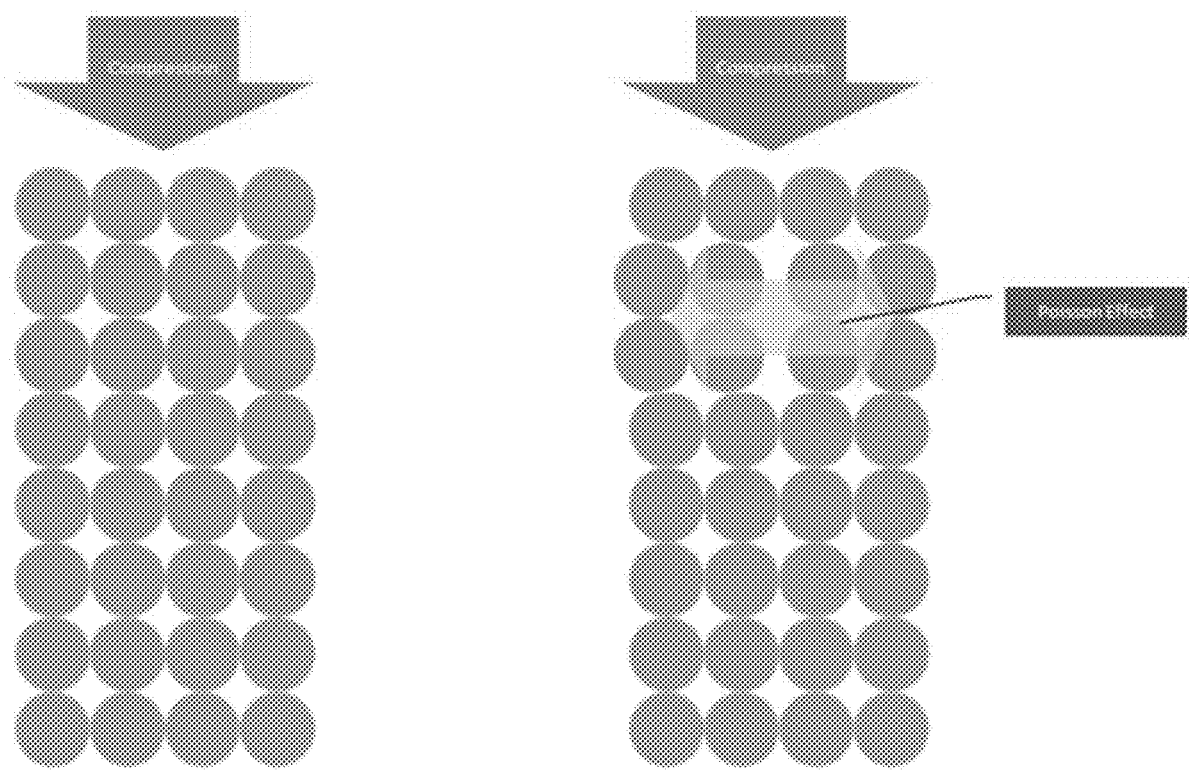

FIG. 55 is a schematic illustration of the Poisson effect.

Figure 56:
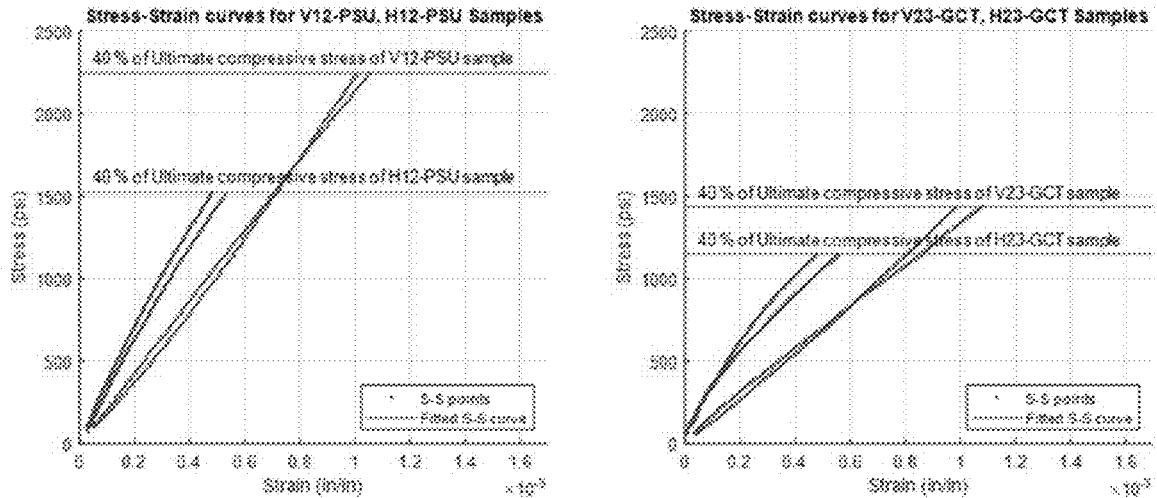

FIG. 56 is a graph of inclination comparison of stress-strain curves in varying tool-path orientation with same concrete; V12-PSU and H12-PSU samples (left), and V23-GCT and H23-GCT samples (right).

Figure 57:
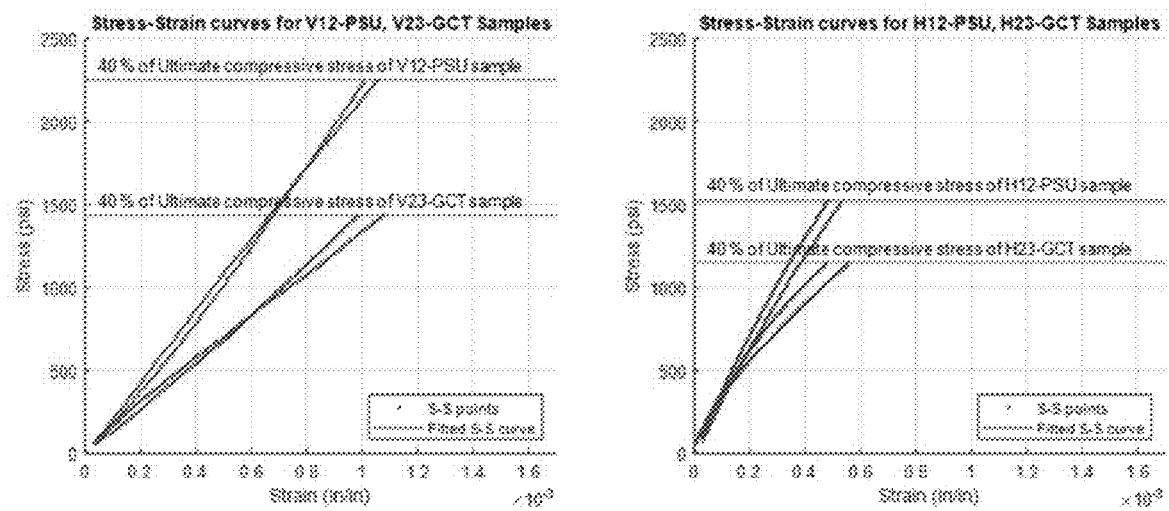

FIG. 57 is a graph of inclination comparison of stress-strain curves in varying concrete type with same tool-path orientation; V12-PSU and V23-GCT samples (left), and H12-PSU and H23-GCT samples (right).

DETAILED DESCRIPTION

The following discussion is presented to enable a person skilled in the art to make and use embodiments of the invention. Given the benefit of this disclosure, various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled," and variations thereof, are used broadly and encompass both direct and indirect mountings, connections, supports, and couplings. Further, "connected" and "coupled" are not restricted to physical or mechanical connections or couplings.

The present disclosure provides a printable cementitious composition that is particularly suitable for use in printing technologies and can be valuably employed to generate three-dimensional printed structures. The printed three-dimensional structures have surprising and beneficial attributes (e.g., structure and properties) to print structural forms, such as beams, slabs, columns, walls, bases, and foundations. The printable cementitious compositions may be used in a variety of applications, such as three-dimensional printing of above grade and foundation walls and slab-on-grade and footings for homes and other buildings, on-site/off-site printing of beams, columns, slabs, and walls, architectural and structural precast concrete/cementitious components (e.g., precast/prestressed girders of all cross-sectional shapes, cellular and solid precast/prestressed floor and roof panels, cladding panels, cornices, siding, roofing tiles), floor and low slope roof coverings (pavers), different infrastructure systems including bridge piers, cap beams, footings/piles, girders, decks, tunnel ceiling panel, and barriers/parapets, above grade liquid tanks, sumps, cisterns, manholes, pavement, curbs, and tunnel lining, which may be performed without the need of a mold to form the concrete structure.

Due to the relatively fast deposition rates of printing, conventional concrete compositions do not have enough time to gain strength and reach the structuration phase within the printing duration (e.g., a few minutes), and is prone to strength-based failure or collapse caused by low yield stress, low structuration rates, loss of stability, and/or buckling of the composition.

In some embodiments, the printable cementitious compositions provided herein are resistant to strength-based failure and have a suitable yield stress and structuration rates such that the compositions may be printed, extruded, and/or deposited atop previous layers to build a three-dimensional object.

Extruded cementitious compositions are subject to tears or cracking when printed along paths with a curved radius and/or generally non-linear. In some embodiments, the printable cementitious compositions provided herein may be printed, extruded, and/or deposited to form a filament that is substantially or entirely free of tears or cracks. As used herein, a "tear" or "crack" may be defined as a void or absence of material along the outer portion of the printed three-dimensional structure. In some embodiments, the printable cementitious compositions have a smooth outer surface. In some embodiments, at least 70% of the total volume of the outer surface portion of the printed filament is free of tears or cracks, or at least 80%, or at least 85%, or at least 90%, or at least 95%, or at least 99%, or 99.9% of the total volume of the outer surface portion of the printed filament is free of tears or cracks when printed on a substrate or a previous layer. The cementitious composition may be free of tears or cracks for a duration. The duration may be for at least one day following deposition and/or printing, or at least two days, or at least three days, or at least four days, or at least 5 days, or at least one week, or at least at least one month, or at least six months, to less than one year, or less than two years, or less than three years.

As used herein, the term "cementitious composition" may refer to compositions or materials comprising cement binders, concrete, mortars, and/or pozzolanic materials. Typically, exposing cement binders, concrete, or mortars to water causes the mixture to undergo hydration, causing the mixture to set, cure, and/or harden over time. As used herein, the "cementitious composition" may refer to a mixture composed of the cement binder, concrete, or mortar and water before the formation of the cementitious composition, during formation of the cementitious composition, and/or after formation of the cementitious composition.

In some embodiments, the printable composition provided herein comprises a cement binder, an aggregate, at least one pozzolanic additive, an accelerator, water, and a nanoclay.

In some embodiments, the cement binder is a hydraulic cement binder or a non-hydraulic cement binder. Suitable cement binders include metal oxides that harden through hydration. Exemplary metal oxides include, but are not limited to, calcium oxides, silicon oxides (e.g., silica), aluminum oxides, iron oxides, magnesium oxides, sodium oxides, potassium oxides, sulfuric anhydrides, and combinations thereof. Non-limiting examples of hydraulic cement binders include Portland cement, Masonry cement, Mortar cement, and combinations thereof.

In some embodiments, the printable cementitious composition contains the cement binder in an amount from 15 wt % to 45 wt %, based on the total weight of the cementitious composition. In some embodiments, the printable cementitious composition contains at least 15 wt % of the cement binder, or at least 16 wt %, or at least 17 wt %, or at least 18 wt %, or at least 19 wt %, or at least 20 wt %, or at least 21 wt %, or at least 22 wt %, or at least 23 wt %, or at least 24 wt %, or at least 25 wt %, or at least 26 wt %, or at least 27 wt %, or at least 28 wt %, or at least 29 wt %, to less than 30 wt %, or less than 31 wt % or less than 32 wt %, or less than 33 wt %, or less than 34 wt %, or less than 35 wt %, or less than 36 wt %, or less than 37 wt %, or less than 38 wt %, or less than 39 wt %, or less than 40 wt %, or less than 41 wt %, or less than 42 wt %, or less than 43 wt %, or less than 44 wt %, or less than 45 wt %, based on total weight of the printable cementitious composition.

In some embodiments, the aggregate is composed of gravel, sand, recycled concrete, basalt, and/or combinations thereof.

In some embodiments, the aggregate comprises one or more material selected from aluminum oxide (from 14 to 35 wt %, based on the total weight of the aggregate), calcium oxide (from 5 to 25 wt %, based on the total weight of the aggregate), iron oxide (from 5 to 15 wt %, based on the total weight of the aggregate), magnesium oxide (from 5 to 15 wt %, based on the total weight of the aggregate), silica (less than 1 wt %, based on the total weight of the aggregate), calcium sulfate (from 0 to 6 wt %, based on the total weight of the aggregate), and ferro-actinolite (from 0 to 6 wt %, based on the total weight of the aggregate). Non-limiting examples of aggregate suitable for use in the printable cementitious composition include Har Tru Basalt provided by Har-Tru.

In some embodiments, the aggregate comprises one or more material selected from silicates and oxides of calcium, sodium, aluminum, silicon, iron, magnesium, and tin. In some embodiments, the aggregate includes one or more naturally occurring materials such as calcium-sodium alumino silicates (e.g., plagioclase feldspar), calcium iron magnesium alumino silicates (e.g., pyroxene), iron titanium oxide (titanomagnetite), and silica (e.g., quartz). Non-limiting examples of aggregates suitable for use in the printable cementitious composition include Tilcon Basalt provided by Tilcon New York Inc.

In some embodiments, the aggregate is composed of particles having a particle size from 0.01 mm to 5 mm. In some embodiments, the aggregate is composed of particles having a particle size of at least 0.01 mm, or at least 0.1 mm, or at least 0.2 mm, or at least 0.3 mm, or at least 0.4 mm, or at least 0.5 mm, or at least 0.6 mm, or at least 0.7 mm, to less than 0.8 mm, or less than 0.9 mm, or less than 1 mm, or less than 1.1 mm, or less than 1.2 mm, or less than 1.3 mm, or less than 1.4 mm, or less than 1.5 mm, or less than 1.6 mm, or less than 1.7 mm, or less than 1.8 mm, or less than 1.9 mm, or less than 2.0 mm, or less than 3.0 mm, or less than 4.0 mm, or less than 5.0 mm. The gradation (i.e., size distribution) of Har-Tru and Tilcon aggregates is displayed in FIG. 25. Both passed sieve #16 suggesting the size of grains in the composition are smaller than 1.18 mm.

In some embodiments, the printable cementitious composition contains from 35 wt % to 60 wt % aggregate, based on the total weight of the printable cementitious composition. In some embodiments, the printable cementitious composition contains at least 35 wt % aggregate, or at least 36 wt %, or at least 37 wt %, or at least 38 wt %, or at least 39 wt %, or at least 40 wt %, or at least 41 wt %, or at least 42 wt %, or at least 43 wt %, or at least 44 wt %, to less than 45 wt %, or less than 46 wt %, or less than 47 wt %, or less than 48 wt %, or less than 49 wt %, or less than 50 wt %, or less than 51 wt %, or less than 52 wt %, or less than 53 wt %, or less than 54 wt %, or less than 55 wt %, or less than 56 wt %, or less than 57 wt %, or less than 58 wt %, or less than 59 wt %, or less than 60 wt %, based on total weight of the printable cementitious composition.

In some embodiments, the printable cementitious composition comprises at least one pozzolanic additive. Suitable pozzolanic additives include, but are not limited to, silica fume, slag, metakaolin, fly ash, limestone, and calcined clay. In some embodiments, the printable cementitious composition contains from 1 wt % to 25 wt % pozzolanic additive(s), based on the total weight of the printable cementitious composition. In some embodiments, the printable cementitious composition contains at least 1 wt % pozzolanic additive(s), or at least 2 wt %, or at least 3 wt %, or at least 4 wt %, or at least 5 wt %, or at least 6 wt %, or at least 7 wt %, or at least 8 wt %, or at least 9 wt %, or at least 10 wt %, or at least 11 wt %, or at least 12 wt %, to less than 13 wt %, or less than 14 wt %, or less than 15 wt %, or less than 16 wt %, or less than 17 wt %, or less than 18 wt %, or less than 19 wt %, or less than 20 wt %, or less than 25 wt %, based on the total weight of the printable cementitious composition.

In some embodiments, the at least one pozzolanic additive includes silica fume. In some embodiments, the printable cementitious composition contains from 0.5 wt % to 5 wt % silica fume, based on total weight of the printable cementitious composition. In some embodiments, the printable cementitious composition contains at least 0.5 wt % silica fume, or at least 1 wt %, or at least 1.5 wt %, or at least 2 wt %, to less than 2.5 wt %, or less than 3 wt %, or less than 3.5 wt %, or less than 4 wt %, or less than 4.5 wt %, or less than 5 wt %, based on the total weight of the printable cementitious composition.

In some embodiments, the at least one pozzolanic additive includes slag. In some embodiments, the printable cementitious composition contains from 1 wt % to 20 wt % slag, based on total weight of the printable cementitious composition. In some embodiments, the printable cementitious composition contains at least 1 wt % slag, or at least 2 wt %, or at least 3 wt %, or at least 4 wt %, or at least 5 wt %, or at least 6 wt %, or at least 7 wt %, or at least 8 wt %, or to less than 9 wt %, or less than 10 wt %, or less than 15 wt %, or less than 20 wt % slag, based on the total weight of the printable cementitious composition.

In some embodiments, the at least one pozzolanic additive includes metakaolin. In some embodiments, the printable cementitious composition contains from 0.5 wt % to 10 wt % metakaolin, based on total weight of the printable cementitious composition. In some embodiments, the printable cementitious composition contains at least 0.5 wt % metakaolin, or at least 1 wt %, or at least 1.5 wt %, or at least 2 wt %, or at least 2.5 wt %, or at least 3 wt %, to less than 3.5 wt %, or less than 4 wt %, or less than 4.5 wt %, or less than 5 wt %, or less than 6 wt %, or less than 7 wt %, or less than 8 wt %, or less than 9 wt %, or less than 10 wt % based, on the total weight of the printable cementitious composition.

In some embodiments, the printable cementitious composition comprises an accelerator. As used herein, the term "accelerator" may refer to compounds or chemical moieties that increase the setting time of the cementitious composition. In some embodiments, the accelerator includes water soluble calcium compounds and/or water soluble silicate compounds.

Exemplary water soluble calcium compounds include, but are not limited to, calcium chloride, calcium nitrate, calcium formate, calcium acetate, calcium bicarbonate, calcium bromide, calcium carbonate, calcium citrate, calcium chlorate, calcium fluoride, calcium gluconate, calcium hydroxide, calcium hypochloride, calcium iodate, calcium iodide, calcium lactate, calcium nitrite, calcium oxalate, calcium phosphate, calcium propionate, calcium silicate, calcium stearate, calcium sulphate, calcium sulphate hemihydrate, calcium sulphate dihydrate, calcium sulphide, calcium tartrate calcium aluminate, tricalcium silicate and/or dicalcium silicate.

In some embodiments, calcium citrate, calcium tartrate, calcium formate, calcium acetate, calcium nitrate, and/or calcium sulphate may offer particular advantages due to their non-corrosive properties.

Exemplary water soluble silicate compounds include sodium silicate, potassium silicate, waterglass, aluminum silicate, tricalcium silicate, dicalcium silicate, calcium silicate, silicic acid, sodium metasilicate and/or potassium metasilicate. Sodium silicate, potassium silicate, and/or waterglass are particularly advantageous due to high water solubility. Further, sodium silicate and/or sodium metasilicate are substantially cheaper reagents compared to calcium chloride, which is also corrosive.

In some embodiments, the printable cementitious composition contains from 0.1 wt % to 5 wt % accelerator, based on the total weight of the printable cementitious composition. In some embodiments, the printable cementitious composition contains at least 0.1 wt % accelerator, or at least 0.2 wt %, or at least 0.3 wt %, or at least 0.4 wt %, or at least 0.5 wt %, or at least 0.6 wt %, or at least 0.7 wt %, or at least 0.8 wt %, or at least 0.9 wt %, or at least 1 wt %, to less than 1.5 wt %, less than 2 wt %, less than 3 wt %, less than 4 wt %, or less than 5 wt %, based on the total weight of the cementitious composition.

In some embodiments, the printable cementitious composition comprises a water-reducing agent. As used herein, the term "water-reducing agent" may refer to a compound that improves the flow characteristics in the cementitious composition and/or allows for the production of a cementitious composition having reduced water content. Exemplary water-reducing agents include, but are not limited to, lignosulphonates, lignosulphonate salts, sulfonated naphthalene formaldehyde condensate, sulfonated melamine formaldehyde condensate, acetone formaldehyde condensate, polycarboxylate ethers, crosslinked melamine or naphthalene sulfonates (e.g., polymelamine sulfonate and polynapthalene sulfonate), and combinations thereof. Non-limiting examples include Sika® ViscoCrete® 225 (P-225).

In some embodiments, the printable cementitious composition contains from 0.01 wt % to 2 wt % water-reducing agent, based on the total weight of the printable cementitious composition. In some embodiments, the printable cementitious composition contains at least 0.01 wt %, or at least 0.05 wt %, or at least 0.1 wt %, or at least 0.15 wt %, or at least 0.2 wt %, to less than 0.5 wt %, or less than 1 wt %, or less than 2 wt %, based on the total weight of the printable cementitious composition.

In some embodiments, the printable cementitious composition comprises water. In some embodiments, the printable cementitious composition contains from 5 wt % to 20 wt % water, based on total weight of the printable cementitious composition. In some embodiments, the printable cementitious composition contains at least 5 wt % water, or at least 6 wt %, or at least 7 wt %, or at least 8 wt %, or at least 9 wt %, or at least 10 wt %, or at least 11 wt %, or at least 12 wt %, or at least 13 wt %, to less than 14 wt %, or less than 15 wt %, or less than 16 wt %, or less than 17 wt %, or less than 18 wt %, or less than 19 wt %, or less than 20 wt %, based on total weight of the printable cementitious composition.

In some embodiments, the printable cementitious composition comprises nanoclay. Exemplary nanoclays include, but are not limited to, montmorillonite, bentonite, kaolinite, hectorite, halloysite, and combinations thereof. In some embodiments, the nanoclay is composed of mineral silicates. In some embodiments, the nanoclay has a particle size or physical dimension from 1 nm to 5 μm, from 1 nm to 1 μm, from 1 nm to 500 nm, or from 1 nm to 150 nm.

In some embodiments, the printable cementitious composition contains from 0.01 wt % to 5 wt % nanoclay, based on the total weight of the printable cementitious composition. In some embodiments, the printable cementitious composition contains at least 0.01 wt %, or at least 0.05 wt %, or at least 0.1 wt %, or at least 0.15 wt %, or at least 0.2 wt %, or at least 0.3 wt %, or at least 0.4 wt %, or at least 0.5 wt %, to less than 1 wt %, or less than 2 wt %, or less than 3 wt %, or less than 4 wt %, or less than 5 wt %, based on the total weight of the printable cementitious composition.

In some embodiments, the printable cementitious composition has a water to cement binder ratio (w/c) from 30% to 50%. In some embodiments, the w/c is at least 30%, or at least 35%, or at least 40%, to less than 45%, or less than 50%.

In some embodiments, the printable cementitious composition has a flow table test (cm) from 15 cm to 20 cm. In some embodiments, the printable cementitious composition has a flow table test (cm) of at least 15 cm, or at least 16 cm, to less than 17 cm, or less than 18 cm, or less than 19 cm, or less than 20 cm. The flow table test may be measured in accordance with ASTM C230.

In some embodiments, the printable cementitious composition has an initial set time from 50 minutes to 180 minutes. In some embodiments, the printable cementitious composition has an initial set time of at least 50 minutes, or at least 60 minutes, or at least 70 minutes, or at least 80 minutes, or at least 90 minutes, or at least 100 minutes, to less than 110 minutes, or less than 120 minutes, or less than 130 minutes, or less than 140 minutes, or less than 150 minutes, or less than 160 minutes, or less than 170 minutes, or less than 180 minutes. The initial set time may be measured in accordance with ASTM C191.

In some embodiments, the printable cementitious composition has a final set time from 80 minutes to 300 minutes. In some embodiments, the printable cementitious composition has a final set time of at least 80 minutes, or at least 90 minutes, or at least 100 minutes, or at least 120 minutes, or at least 140 minutes, or at least 160 minutes, or at least 180 minutes, or at least 200 minutes, to less than 220 minutes, or less than 240 minutes, or less than 260 minutes, or less than 280 minutes, or less than 300 minutes. The final set time may be measured in accordance with ASTM C191.

In some embodiments, the printable cementitious composition has a fresh density from 2.0 to 2.4 g/cm$^3$. In some embodiments, the printable cementitious composition has a fresh density of at least 2.0 g/cm$^3$, or at least 2.05 g/cm$^3$, or at least 2.1 g/cm$^3$, to less than 2.15 g/cm$^3$, or less than 2.2 g/cm$^3$, or less than 2.25 g/cm$^3$, or less than 2.3 g/cm$^3$.

In some embodiments, the printable cementitious composition has a 2-day strength from 10 MPa to 55 MPa. In some embodiments, the printable cementitious composition has a 2-day strength test of at least 10 MPa, or at least 15 MPa, or at least 20 MPa, or at least 25 MPa, or at least 30 MPa, or at least 35 MPa, to less than 40 MPa, or less than 45 MPa, or less than 50 MPa, or less than 55 MPa. The 2-day strength may be measured in accordance with ASTM C39.

In some embodiments, the printable cementitious composition has a 28-day strength from 25 MPa to 85 MPa. In some embodiments, the printable cementitious composition has a 28-day strength of at least 25 MPa, or at least 30 MPa, or at least 35 MPa, or at least 40 MPa, or at least 45 MPa, to less than 50 MPa, or less than 60 MPa, or less than 65 MPa, or less than 70 MPa, or less than 75 MPa, or less than 80 MPa, or less than 85 MPa.

Methods:

In some embodiments, the present disclosure provides a method of printing and/or depositing a printable cementitious composition. The method includes depositing a first filament of the provided printable cementitious material on a printing surface from a nozzle of a print head. The method further includes depositing at least one additional filament of the provided printable cementitious material atop the first filament, thereby forming a three-dimensional structure.

In some embodiments, a reinforcement member (e.g., rebar, barbed wire) is contacted with the first filament while concurrently depositing the at least one additional filament of the printable cementitious composition atop the first filament. Alternatively, the reinforcement member may be first contacted on a surface of the first filament of the cementitious material followed by depositing the at least one additional filament of the cementitious material over the reinforcement member and the first filament of the cementitious material.

In some embodiments, the flow of cementitious material is continuous so that a non-interrupted printing of the cementitious material forms along a path defined by movement of the print head. In some embodiments, the three-dimensional structure may be printed through continuous deposition of the cementitious material. For example, an initial printing pattern or path of movement may be repeated until multiple filament layers are deposited atop one another to form the three-dimensional structure. Additionally or alternatively, the printing of the cementitious material may be non-continuous, e.g., the first filament may be printed, followed by contacting the reinforcement member to a surface of the first filament, followed by printing of at least one additional filament.

Test Methods

Compressive Strength Test:

The compressive strength of the designed mixtures was determined by following ASTM C39 and casting six 2×2×2 inch cubes for each mixture. The strength of three cubes of each mixture was measured and averaged at 2 and 28 days. The samples were cured in a controlled moist room at 100% RH and 25° C. before testing them.

Setting Time Test:

Vicat Needle test (ASTM C191) was performed to measure the initial and final setting time of each mixture. This test relies on the penetration of a needle into the paste.

Flow Table Test:

Flow table test (ASTM C230) was conducted to determine the water content for each mixture. General test observation indicates that when the flow table test result is between 15 cm to 20 cm, the material will not flow easily, and such mixture designs would be buildable candidates for printing. Based on such observation, the water content of each mixture was regulated so that the flow table test result in a diameter of 15-20 cm. The water content may be adjusted during actual printing, depending on the size and condition of printing.

Examples

The following examples are presented by way of illustration and are not meant to be limiting in any way.

Twenty-five mixtures (M1-M25) are tested in the present example. The strength, setting time, and flow table tests are measured for each of the twenty-five samples. For each mixture, the initial water/cement binder (w/c) ratio is set to 35%. Additional water was subsequently added to each mixture to alter the total water content in each sample. Table 1 below provides the formulations for mixtures M1-M25.

TABLE 1-1

Mixtures M1-M25 in accordance with some embodiments of the present disclosure.

| MIX ID | Tilcon Basalt | Har Tru Basalt | Initial Water | added water | OPC | MK | SF | Slag | SS | CC | P225 | Nano Clay | W/B |
|---|---|---|---|---|---|---|---|---|---|---|---|---|---|
| M1 | 54% | 0% | 11% | 3% | 32% | 0% | 0% | 0% | 0.0% | 0.0% | 0.0% | 0.0% | 43% |
| M2 | 0.00% | 52% | 11% | 5% | 32% | 0% | 0% | 0% | 0.0% | 0.0% | 0.0% | 0.0% | 50% |
| M3 | 0.00% | 53% | 10% | 3% | 34% | 0% | 0% | 0% | 0.0% | 0.0% | 0.0% | 0.0% | 39% |
| M4 | 0.00% | 54% | 9% | 2% | 35% | 0% | 0% | 0% | 0.0% | 0.0% | 0.1% | 0.0% | 31% |
| M5 | 0.00% | 55% | 12% | 0% | 33% | 0% | 0% | 0% | 0.0% | 0.0% | 0.2% | 0.0% | 35% |
| M6 | 0.00% | 54% | 9% | 1% | 35% | 0% | 0% | 0% | 0.0% | 0.0% | 0.2% | 0.0% | 29% |
| M7 | 0.00% | 59% | 9% | 1% | 30% | 0% | 0% | 0% | 0.0% | 0.0% | 0.1% | 0.0% | 35% |
| M8 | 0.00% | 54% | 10% | 2% | 27% | 7% | 0% | 0% | 0.0% | 0.0% | 0.1% | 0.0% | 36% |
| M9 | 0.00% | 54% | 10% | 2% | 30% | 0% | 3% | 0% | 0.0% | 0.0% | 0.1% | 0.0% | 36% |
| M10 | 0.00% | 53% | 10% | 3% | 23% | 7% | 3% | 0% | 0.0% | 0.0% | 0.1% | 0.0% | 40% |
| M11 | 0.00% | 53% | 10% | 3% | 27% | 0% | 0% | 7% | 0.0% | 0.0% | 0.1% | 0.0% | 40% |
| M12 | 0.00% | 53% | 10% | 3% | 23% | 0% | 3% | 7% | 0.0% | 0.0% | 0.1% | 0.0% | 39% |
| M13 | 0.00% | 54% | 10% | 1% | 34% | 0% | 0% | 0% | 0.2% | 0.0% | 0.1% | 0.0% | 33% |
| M14 | 0.00% | 53% | 10% | 3% | 23% | 7% | 3% | 0% | 0.2% | 0.0% | 0.1% | 0.0% | 40% |
| M15 | 0.00% | 52% | 10% | 4% | 23% | 7% | 3% | 0% | 0.2% | 0.0% | 0.1% | 0.0% | 44% |
| M16 | 0.00% | 54% | 10% | 2% | 23% | 0% | 3% | 7% | 0.2% | 0.0% | 0.1% | 0.0% | 37% |
| M17 | 0.00% | 53% | 11% | 4% | 31% | 0% | 0% | 0% | 1.6% | 0.0% | 0.0% | 0.0% | 48% |

TABLE 1-1-continued

Mixtures M1-M25 in accordance with some embodiments of the present disclosure.

| MIX ID | Tilcon Basalt | Har Tru Basalt | Initial Water | added water | OPC | MK | SF | Slag | SS | CC | P225 | Nano Clay | W/B |
|---|---|---|---|---|---|---|---|---|---|---|---|---|---|
| M18 | 0.00% | 53% | 11% | 3% | 32% | 0% | 0% | 0% | 0.2% | 0.0% | 0.0% | 0.0% | 44% |
| M19 | 0.00% | 53% | 11% | 3% | 32% | 0% | 0% | 0% | 0.3% | 0.0% | 0.0% | 0.0% | 43% |
| M20 | 0.00% | 47% | 11% | 6% | 24% | 0% | 4% | 7% | 0.9% | 0.0% | 0.0% | 0.0% | 47% |
| M21 | 0.00% | 47% | 11% | 5% | 25% | 0% | 4% | 7% | 0.0% | 0.4% | 0.0% | 0.0% | 46% |
| M22 | 0.00% | 47% | 11% | 5% | 25% | 0% | 4% | 7% | 0.0% | 0.9% | 0.0% | 0.0% | 45% |
| M23 | 0.00% | 47% | 17% | 0% | 14% | 0% | 4% | 18% | 0.2% | 0.0% | 0.0% | 0.0% | 46% |
| M24 | 0.00% | 42% | 15% | 0% | 29% | 0% | 4% | 9% | 0.0% | 1.1% | 0.0% | 0.1% | 34% |
| M25 | 0.00% | 41% | 14% | 0% | 29% | 0% | 4% | 9% | 1.1% | 0.0% | 0.0% | 0.1% | 34% |

Note:
OPC = ordinary portland cement;
MK = Metakaolin;
SS = sodium Metasilicate;
SF = silica fume;
CC = Calcium Chloride;
WRA = Water Reducing Admixtures;
W/C = water to cement ratio.
All percentages are weight percentages of the specified component, based on the total weight of the composition.

TABLE 1-2

Oxide composition of individual constituents by mass %.

| Oxides | $SiO_2$ | $Al_2O_3$ | CaO | $Fe_2O_3$ | MgO | $SO_3$ | $Na_2O_{eq}$ | LOI |
|---|---|---|---|---|---|---|---|---|
| Cement | 19.25 | 4.65 | 62.30 | 3.52 | 4.08 | 2.71 | 0.51 | 2.5 |
| MK | 58.18 | 23.33 | 3.89 | 0.68 | 0.84 | 0.08 | 9.78 | 1.9 |
| SF | 93.96 | 0.24 | 0.69 | 0.26 | 0.48 | 0.07 | 0.51 | 3.2 |
| BFS | 30.80 | 11.45 | 47.50 | 2.26 | 3.65 | 3.03 | 0.27 | 2.6 |
| SS | 46.23 | 0.05 | 0.05 | 0.08 | — | 0.03 | 49.63 | 3.8 |
| NC | 55.20 | 12.20 | 1.98 | 4.05 | 8.56 | — | 0.98 | 15.7 |

Compressive strength (two day and twenty-eight day), setting time, and flow table tests were conducted for each mixture. The material properties for each mixture is provided in Table 2 below.

TABLE 2

Material Properties of mixture M1-M25.

| Sample ID | Flow Test (cm) | Initial Set (min) | Final Set (min) | Fresh Density (g/cm3) | 2 day strength (Mpa) | 28 day strength (Mpa) |
|---|---|---|---|---|---|---|
| M1 | 19.30 | 172.00 | 279.00 | 2.27 | 29.10 | 60.07 |
| M2 | 20.70 | 172.00 | 272.00 | 2.22 | 29.17 | 45.05 |
| M3 | 18.10 | 157.70 | 273.00 | 2.27 | 41.10 | 64.59 |
| M4 | 18.00 | 68.50 | 205.00 | 2.33 | 52.20 | 77.95 |
| M5 | too flowable | 144.50 | 434.00 | 2.23 | 53.50 | 79.95 |
| M6 | 23.50 | 60.30 | 139.00 | 2.14 | 48.53 | 67.93 |
| M7 | 17.30 | 51.80 | 230.00 | 2.26 | 52.33 | 74.27 |
| M8 | 16.00 | 103.00 | 240.00 | 2.14 | 38.10 | 59.13 |
| M9 | 17.50 | 138.00 | 205.00 | 2.22 | 45.40 | 78.37 |
| M10 | 16.90 | 117.00 | 220.00 | 2.14 | 32.20 | 67.76 |
| M11 | 18.80 | 53.50 | 159.00 | 2.17 | 47.18 | 72.84 |
| M12 | 18.30 | 116.80 | 206.00 | 2.20 | 36.51 | 77.61 |
| M13 | 17.40 | 63.70 | 139.00 | 0.00 | 51.10 | 73.72 |
| M14 | 19.80 | 161.90 | 235.00 | 2.21 | 32.23 | 54.43 |
| M15 | 20.00 | 139.20 | 195.00 | 2.08 | 24.28 | 52.74 |
| M16 | 18.20 | 70.00 | 147.00 | 2.21 | 39.04 | 72.05 |
| M17 | 17.70 | 20.00 | 38.00 | 2.14 | 12.80 | 26.70 |
| M18 | 19.90 | 135.00 | 270.00 | 2.23 | 35.50 | 57.09 |
| M19 | 19.40 | 105.80 | 250.00 | 2.26 | 30.50 | 53.66 |
| M20 | 18.50 | 100.00 | 120.00 | 2.25 | 22.18 | 42.14 |
| M21 | 18.00 | 140.00 | 175.00 | 2.18 | 31.07 | 62.63 |
| M22 | 17.70 | 75.00 | 90.00 | 2.21 | 27.56 | 58.94 |
| M23 | 20.50 | 76.00 | 88.00 | 2.20 | 15.33 | 42.60 |
| M24 | 19.60 | 85.00 | 100.00 | 2.14 | 27.21 | 62.50 |
| M25 | 19.50 | 90.00 | 120.00 | 2.11 | 24.87 | 44.67 |

The effect of these additives on the preliminary test results and a review of observations in Table 2 are also discussed in the present example.

Water Reducing Agent (WRA)—P-225:

The water reducing agent used in mixtures M1-M25 is Sika® ViscoCrete® 225 Powder and is a high range water reducing powdered superplasticizer. The Sika® ViscoCrete® 225 Powder (P 225) is a polycarboxylate powder and has a bulk density of about 0.6 g/cm³. The WRA was added in the present examples in an amount from 0.00 wt % to 0.17 wt %, based on total weight of the composition. Mixtures containing P-225 had reduced water proportion and followability of the cementitious material. The P-225 increased the strength and shortened setting time of the mixture. The P-225 decreases the yield stress of the slurry, and at high dosages (e.g., >0.17 wt %) makes the mixture thin with zero yield stress. FIGS. 1-4 illustrate compressive strength vs. percentage WRA for 2-day and 28-day mixtures, setting time vs percentage WRA for initial set time and final set time, water/dry mixture (%) vs percentage WRA, and flow test vs percentage WRA, respectively. FIGS. 1-4 illustrate material properties for mixtures M2, M3, M4, and M6.

Accelerator—Calcium Chloride

Calcium chloride (CC) is used as an accelerator in three mixture designs (M21, M22, and M24). FIGS. 5-8 illustrate the effect of CC inclusion on the mixture when present in an amount of 0.36 wt % and 0.91 wt %, based on total weight of the mixture. The addition of 0.91 wt % CC resulted in 3 times faster setting time. Addition of a higher dosage of CC (e.g., 1.05% in Mixture M24) led to larger w/c ratio while the flow table test result remained constant. FIGS. 5-8 illustrate compressive strength vs. percentage CC, setting time vs. percentage CC, water/dry mixture percentage vs percentage CC, and flow table test vs percentage CC, respectively. FIGS. 5-8 illustrate material properties for M2, M21, and M22.

Accelerator—Sodium Metasilicate

CC used in the study was a lab-grade admixture and it is an expensive accelerator, which can also result in corrosion of steel reinforcement used in concrete. A less costly accelerator that does not have the disadvantages of CC would be sodium metasilicate (SS). SS accelerates the reaction process in the cementitious materials. Tests are run with different proportions of up to 1.61 wt % of the mixture. FIGS. 9-12 show the influence of adding SS to the cement mixture.

Addition of 1.67% SS to the mixture resulted in increased setting speed (20 minutes initial setting and 38 minutes final setting). Setting speeds of 20 min and 38 minutes may not be suitable for printing concrete, as the material would set inside the nozzle/hose, and may cause cold joints between the different printed layers, lowering the material strength.

A cold joint is a term used to describe lack of bond between two different pours of concrete. For example, if a first batch of concrete is poured within a formwork, and half way through the first batch is used up, a lag period is created as a second batch of concrete is transferred to the formwork to be poured. If the lag period between the pours is long, the first batch sets and hardens, and the second batch may not bond as well to the first batch, creating a cold joint aspect. This is particularly relevant in the context of printed concrete, which sets fast and may not form proper bonds to steel rebars if embedded therein.

Two lower quantities of SS, 0.17 and 1.04% weight percent of the mixture are used in several mixture designs and printing sessions. Depending on the size of the concrete elements to be printed and ambient conditions, the dosage of SS could be determined. The results also show that addition of SS does not change the water content (w/dry mixture) and the results of flow table test. FIGS. 9-12 illustrate compressive strength vs. percentage CC, setting time vs. percentage CC, water/dry mixture percentage vs. percentage CC, and flow table test vs. percentage CC, respectively. FIGS. 9-12 illustrate material properties for M2, M17, M18, and M19.

Pozzolanic Additive—Metakaolin Powder

Metakaolin powder (MK) may be used as a pozzolanic additive to lower the cement content of cementitious mixtures and enhance the material properties of concrete in the fresh and later ages. FIGS. 13-16 depict the effect of adding 6.78% of MK on the preliminary test results. FIGS. 13-16 illustrate compressive strength vs. percentage MK, setting time vs. percentage MK, water/dry mixture percentage vs. percentage MK C, and flow table test vs. percentage MK, respectively. As shown in FIGS. 13-16, the addition of MK is narrowly impactful to insignificant on the water content of the mortar and flow table test. Further, FIGS. 13-14 indicate that the incorporation of MK can increase the strength by 1.31 times and reduce the initial and final setting time by 40% and 12%, respectively. FIGS. 13-16 illustrate material properties for M2 and M8.

Pozzolanic Additive—Slag

Slag (S) may also be used as a pozzolanic additive to lower the cement content and increase the strength of the cementitious mixtures. FIGS. 17-20 illustrate the results of adding 6.69 weight percent S to exemplary mixtures. As shown in FIGS. 17-20, the addition of 6.69 weight percent S increases the strength up to 62% and shortens the setting time considerably, while the water content and flow table are roughly unchanged. FIGS. 17-20 illustrate material properties for M2 and M11.

Pozzolanic Additive—Silica Fume

Silica Fume (SF) may be used to increase the buildability of the cementitious material. FIGS. 21-24 illustrate the results of adding 3.38 weight percent SF to the exemplary cementitious mixtures. The addition of SF showed that it can significantly increase the buildability of the cementitious mixture design for printing purposes, such as by promoting strength, reducing setting time, and increasing yield stress. FIGS. 21-24 illustrate material properties for M2 and M9.

Aggregate—Tilcon and Har Tru Basalt

Figure 1:
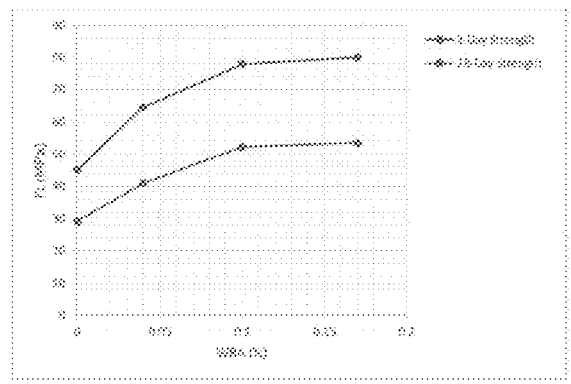
FIG. 1 is a graph illustrating the strength of a printable cementitious composition as a function of the water-reducing agent content in accordance with some embodiments of the present disclosure.
Figure 2:
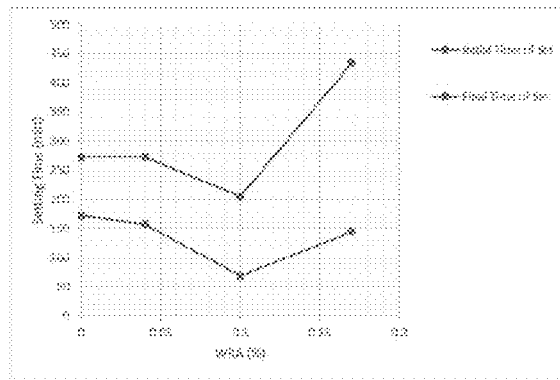
FIG. 2 is a graph illustrating the setting time of a printable cementitious composition as a function of the water-reducing agent content in accordance with some embodiments of the present disclosure.
Figure 3:
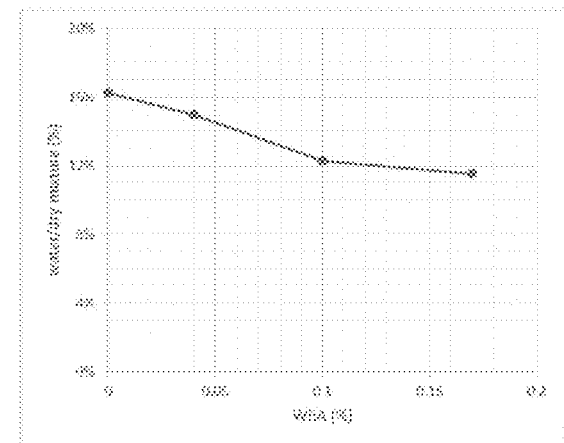
FIG. 3 is a graph illustrating water/dry mixture percentage of a printable cementitious composition as a function of the water-reducing agent content in accordance with some embodiments of the present disclosure.
Figure 4:
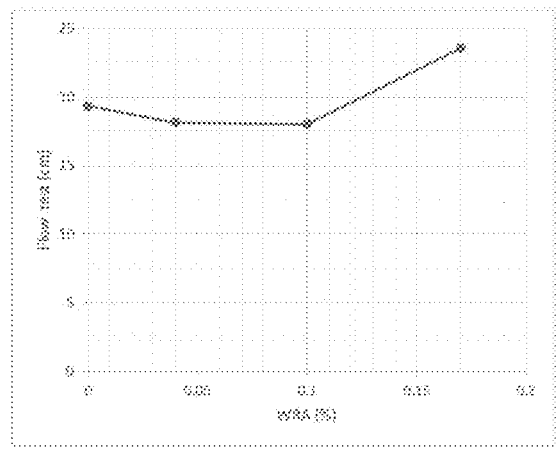
FIG. 4 is a graph illustrating a flow table test of a printable cementitious composition as a function of the water-reducing agent content in accordance with some embodiments of the present disclosure.
Figure 5:
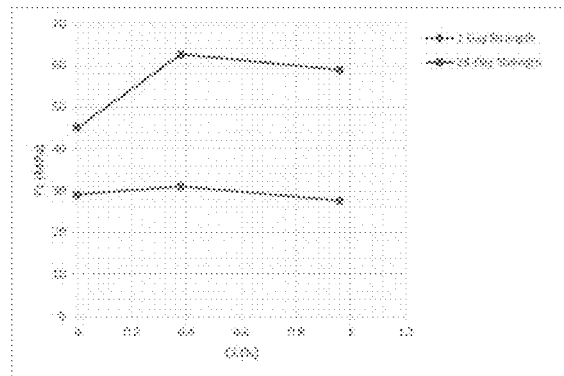
FIG. 5 is a graph illustrating the strength of a printable cementitious composition as a function of the calcium chloride content in accordance with some embodiments of the present disclosure.
Figure 6:
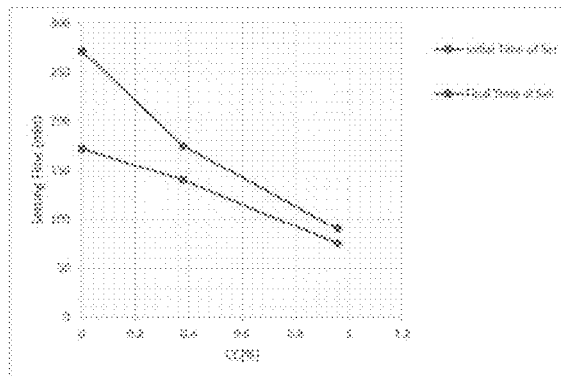
FIG. 6 is a graph illustrating the setting time of a printable cementitious composition as a function of calcium chloride content in accordance with some embodiments of the present disclosure.
Figure 7:
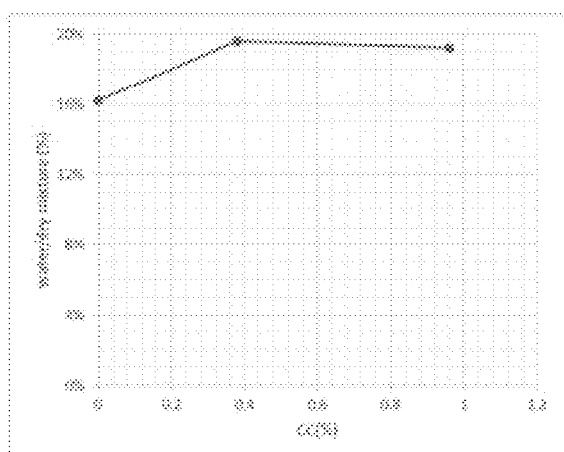
FIG. 7 is a graph illustrating water/dry mixture percentage of a printable cementitious composition as a function of calcium chloride content in accordance with some embodiments of the present disclosure.
Figure 8:
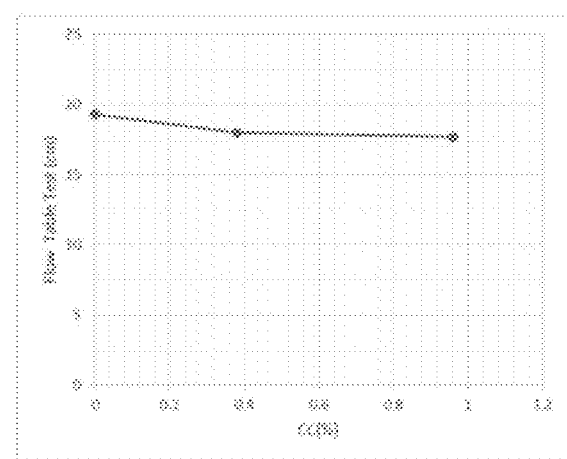
FIG. 8 is a graph illustrating a flow table test of a printable cementitious composition as a function of calcium chloride content in accordance with some embodiments of the present disclosure.
Figure 9:
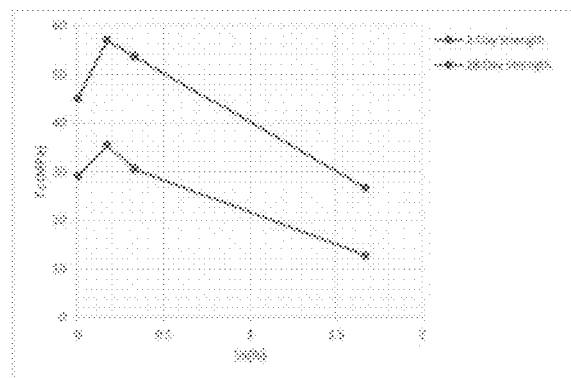
FIG. 9 is a graph illustrating the strength of a printable cementitious composition as a function of sodium metasilicate content in accordance with some embodiments of the present disclosure.
Figure 10:
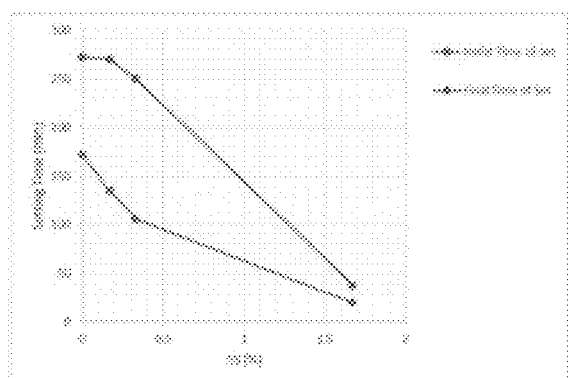
FIG. 10 is a graph illustrating the setting time of a printable cementitious composition as a function of sodium metasilicate content in accordance with some embodiments of the present disclosure.
Figure 11:
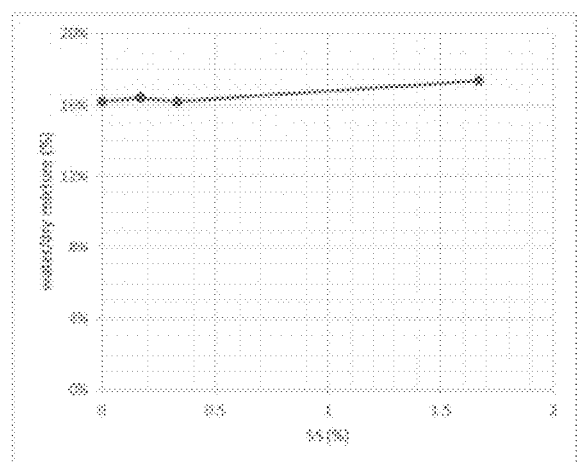
FIG. 11 is a graph illustrating water/dry mixture percentage of a printable cementitious composition as a function of sodium metasilicate content in accordance with some embodiments of the present disclosure.
Figure 12:
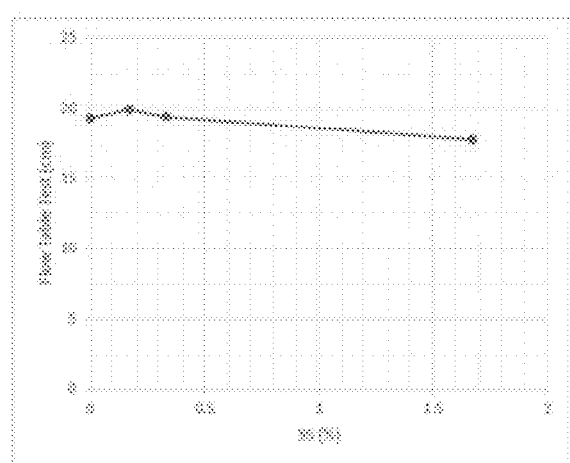
FIG. 12 is a graph illustrating a flow table test of a printable cementitious composition as a function of sodium metasilicate content in accordance with some embodiments of the present disclosure.
Figure 13:
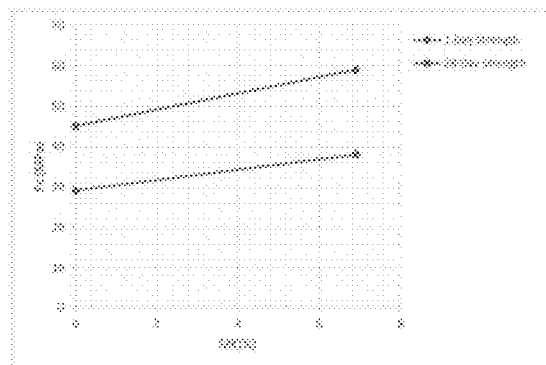
FIG. 13 is a graph illustrating the strength of a printable cementitious composition as a function of the metakaolin content in accordance with some embodiments of the present disclosure.
Figure 14:
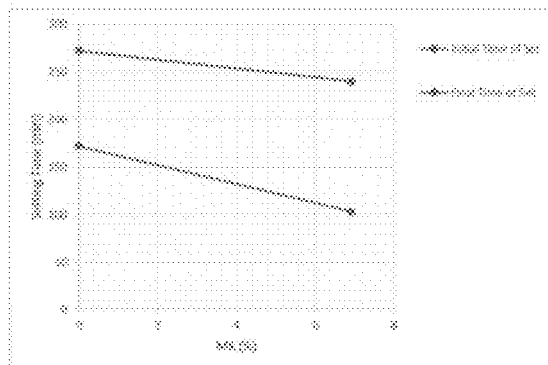
FIG. 14 is a graph illustrating the setting time of a printable cementitious composition as a function of metakaolin content in accordance with some embodiments of the present disclosure.
Figure 15:
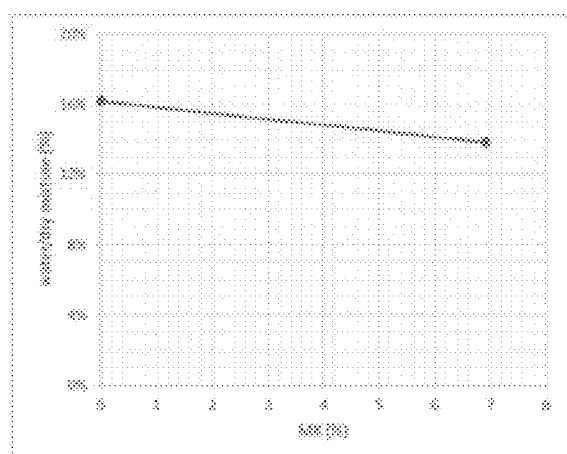
FIG. 15 is a graph illustrating water/dry mixture percentage of a printable cementitious composition as a function of metakaolin content in accordance with some embodiments of the present disclosure.
Figure 16:
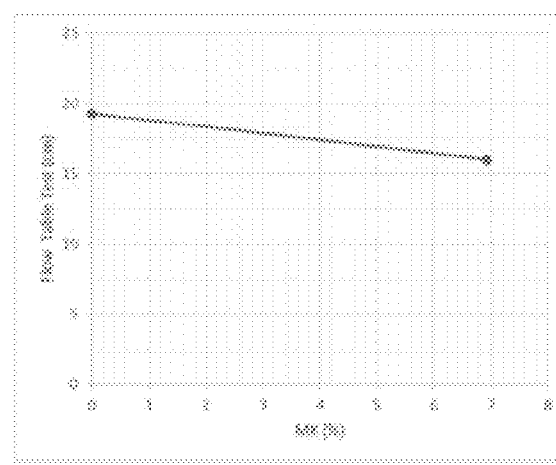
FIG. 16 is a graph illustrating a flow table test of a printable cementitious composition as a function of metakaolin content in accordance with some embodiments of the present disclosure.
Figure 17:
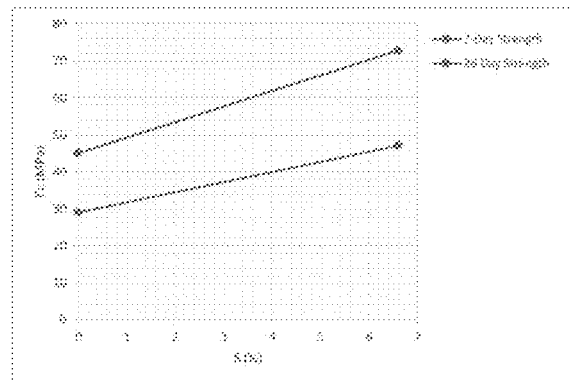
FIG. 17 is a graph illustrating the strength of a printable cementitious composition as a function of slag content in accordance with some embodiments of the present disclosure.
Figure 18:
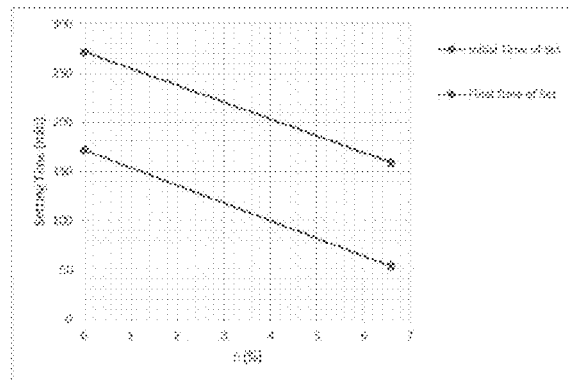
FIG. 18 is a graph illustrating the setting time of a printable cementitious composition as a function of slag content in accordance with some embodiments of the present disclosure.
Figure 19:
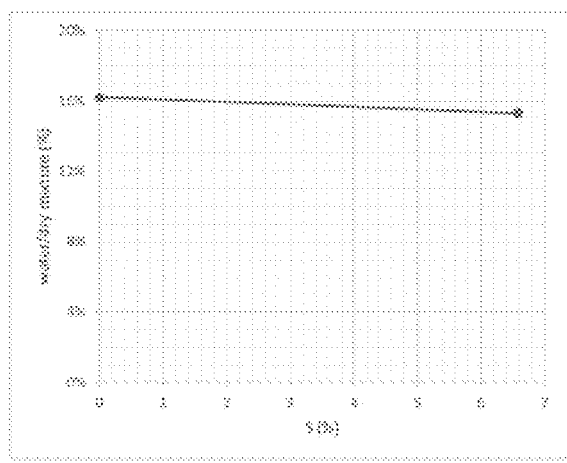
FIG. 19 is a graph illustrating water/dry mixture percentage of a printable cementitious composition as a function of slag content in accordance with some embodiments of the present disclosure.
Figure 20:
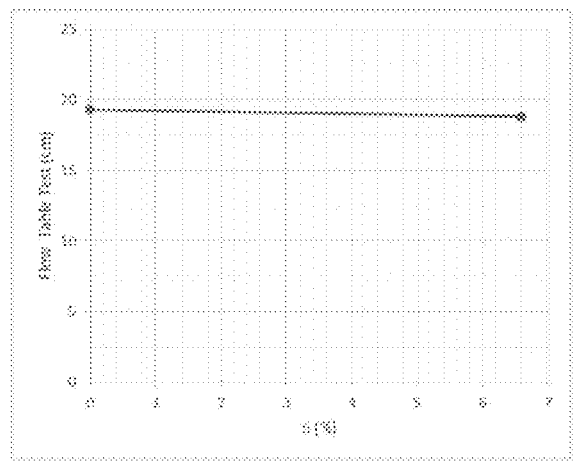
FIG. 20 is a graph illustrating a flow table test of a printable cementitious composition as a function of slag content in accordance with some embodiments of the present disclosure.
Figure 21:
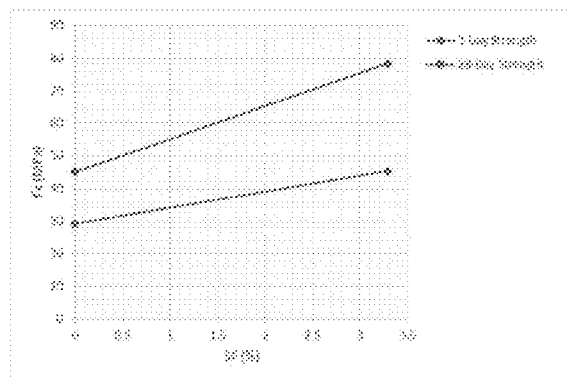
FIG. 21 is a graph illustrating the strength of a printable cementitious composition as a function of silica fume content in accordance with some embodiments of the present disclosure.
Figure 22:
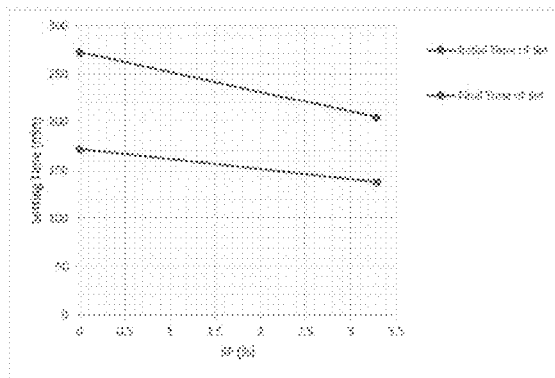
FIG. 22 is a graph illustrating the setting time of a printable cementitious composition as a function of silica fume content in accordance with some embodiments of the present disclosure.
Figure 23:
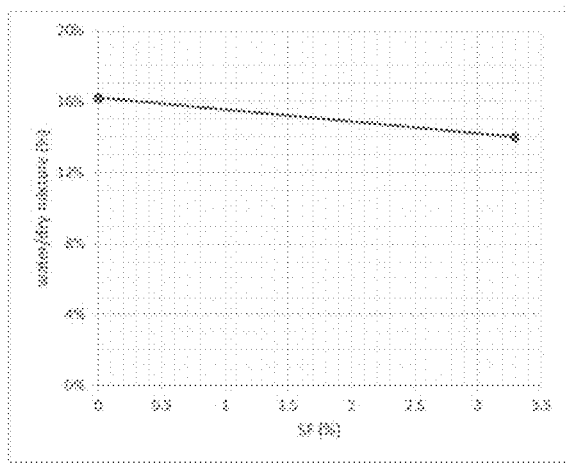
FIG. 23 is a graph illustrating water/dry mixture percentage of a printable cementitious composition as a function of silica fume content in accordance with some embodiments of the present disclosure.
Figure 24:
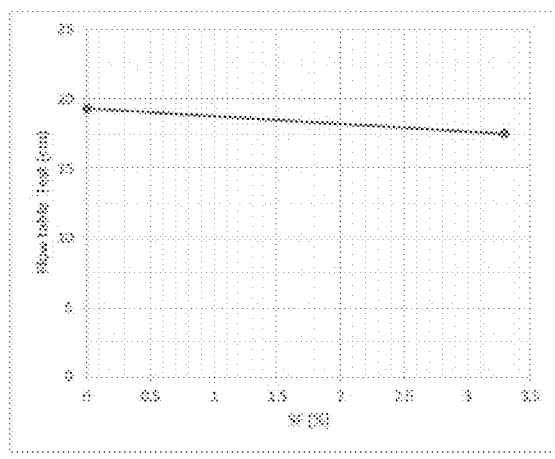
FIG. 24 is a graph illustrating a flow table test of a printable cementitious composition as a function of silica fume content in accordance with some embodiments of the present disclosure.
Figure 25:
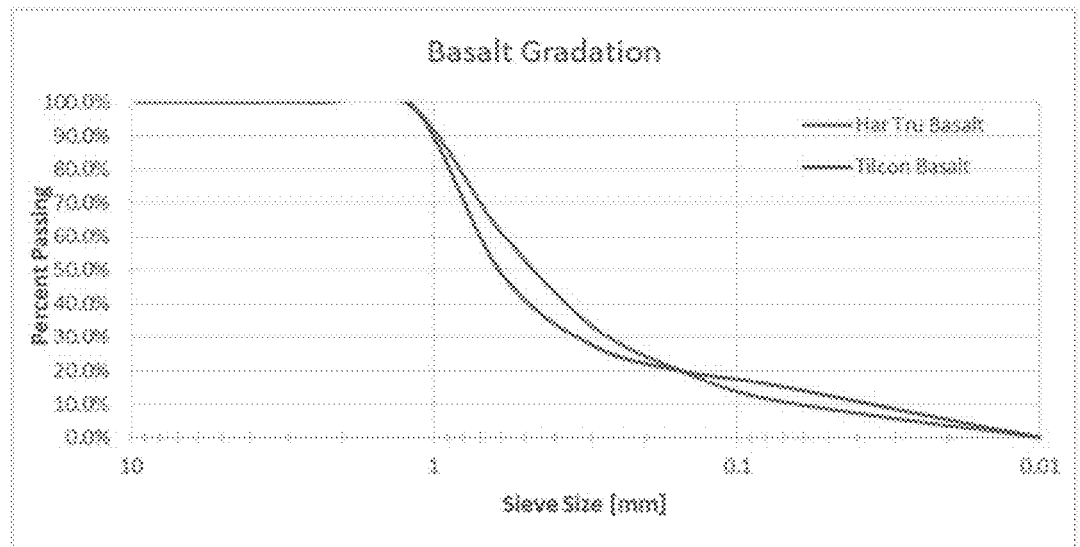
FIG. 25 is a graph illustrating gradation of aggregates in accordance with some embodiments of the present disclosure.
Figure 26:
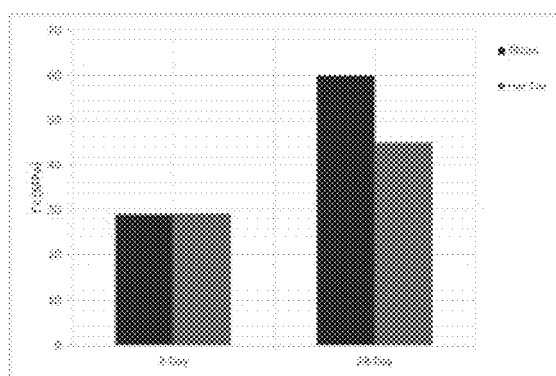
FIG. 26 is a graph illustrating the strength of a printable cementitious composition as a function of basalt selection in accordance with some embodiments of the present disclosure.
Figure 27:
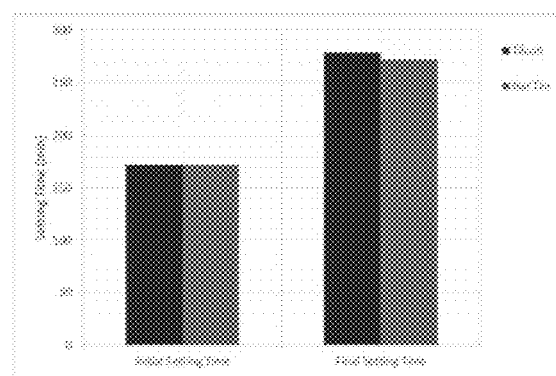
FIG. 27 is a graph illustrating the setting time of a printable cementitious composition as a function of basalt selection in accordance with some embodiments of the present disclosure.
Figure 28:
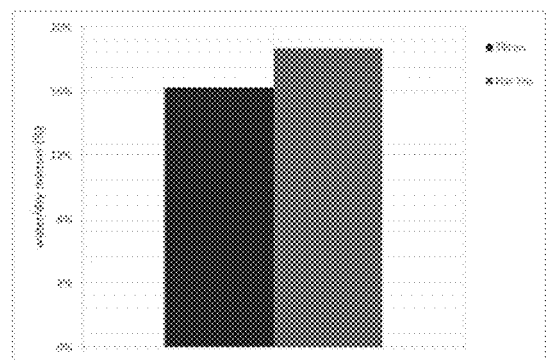
FIG. 28 is a graph illustrating water/dry mixture percentage of a printable cementitious composition as a function of basalt selection in accordance with some embodiments of the present disclosure.
Figure 29:
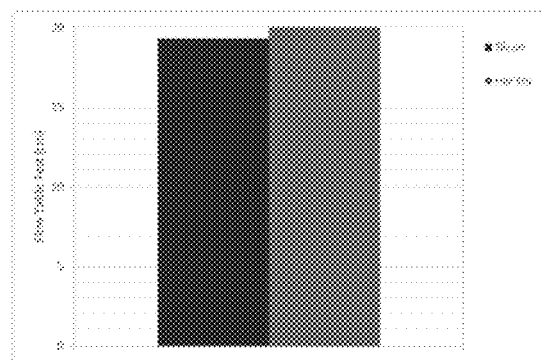
FIG. 29 is a graph illustrating a flow table test of a printable cementitious composition as a function of basalt selection in accordance with some embodiments of the present disclosure.
Figure 30:
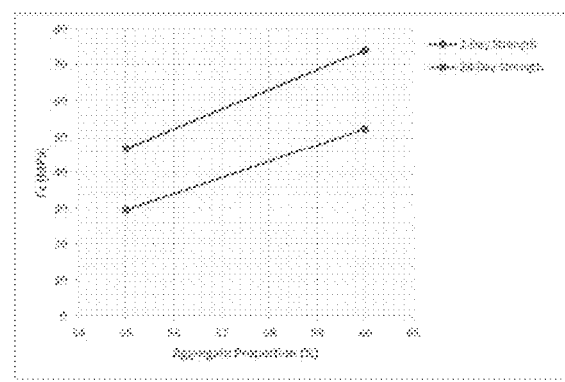
FIG. 30 is a graph illustrating the strength of a printable cementitious composition as a function of basalt content in accordance with some embodiments of the present disclosure.
Figure 31:
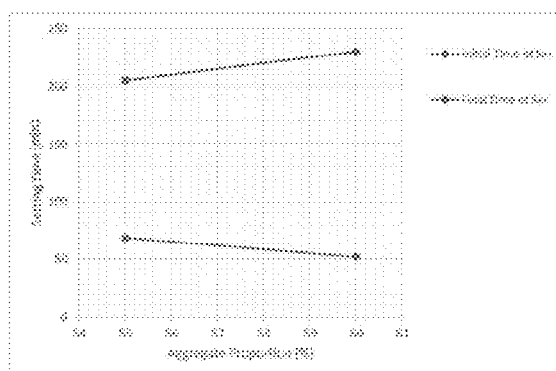
FIG. 31 is a graph illustrating the setting time of a printable cementitious composition as a function of basalt content in accordance with some embodiments of the present disclosure.
Figure 32:
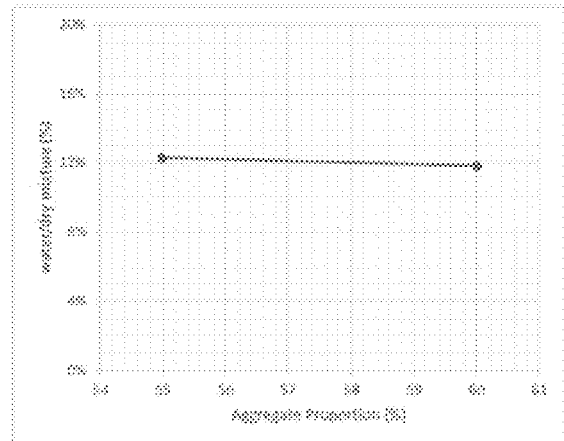
FIG. 32 is a graph illustrating water/dry mixture percentage of a printable cementitious composition as a function of basalt content in accordance with some embodiments of the present disclosure.
Figure 33:
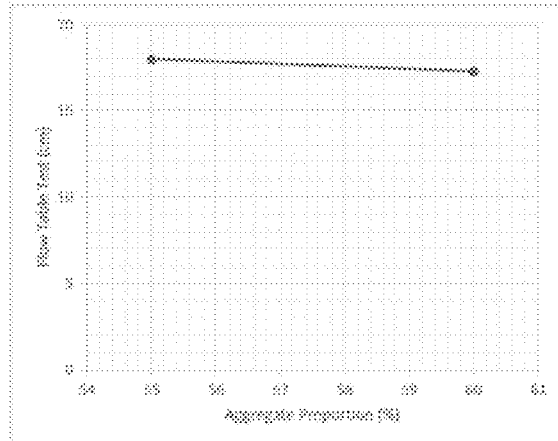
FIG. 33 is a graph illustrating a flow table test of a printable cementitious composition as a function of basalt content in accordance with some embodiments of the present disclosure.
Figure 34:
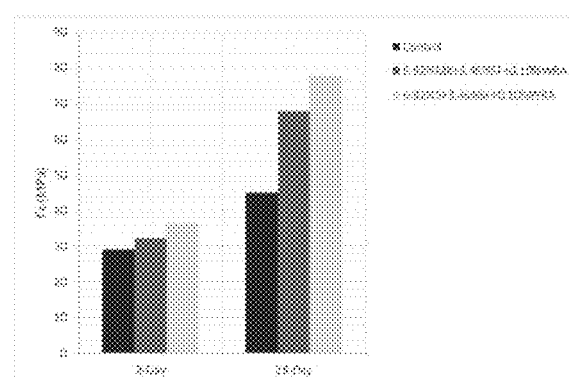
FIG. 34 is a graph illustrating the strength of a printable cementitious composition including metakoalin, silica fume, and a water-reducing agent in accordance with some embodiments of the present disclosure.
Figure 35:
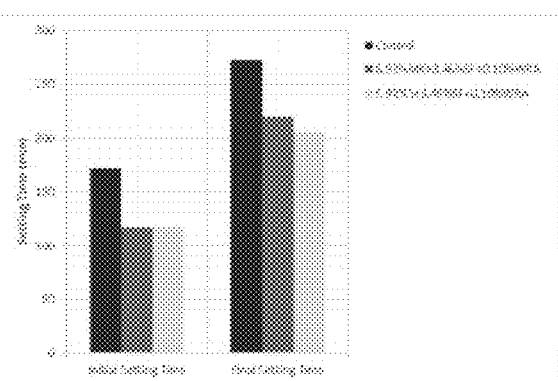
FIG. 35 is a graph illustrating the setting time of a printable cementitious composition including metakoalin, silica fume, and a water-reducing agent in accordance with some embodiments of the present disclosure.
Figure 36:
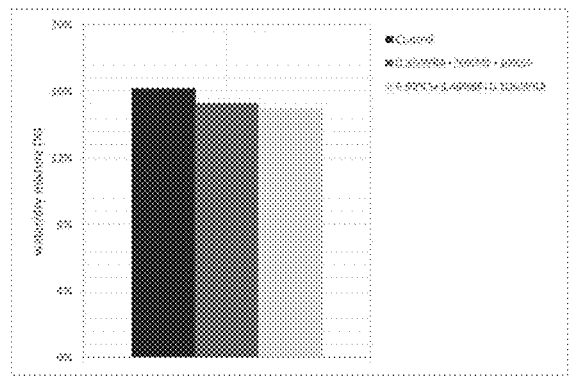
FIG. 36 is a graph illustrating water/dry mixture percentage of a printable cementitious composition including metakoalin, silica fume, and a water-reducing agent in accordance with some embodiments of the present disclosure.
Figure 37:
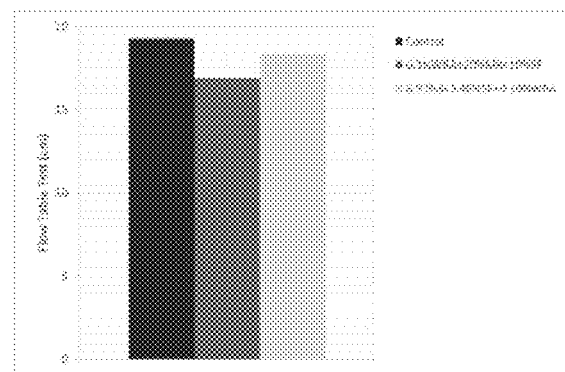
FIG. 37 is a graph illustrating a flow table test of a printable cementitious composition including metakoalin, silica fume, and a water-reducing agent in accordance with some embodiments of the present disclosure.
Figure 38:
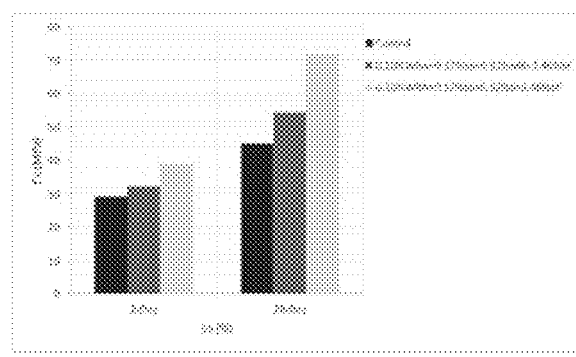
FIG. 38 is a graph illustrating the strength of a printable cementitious composition including slag, silica fume, and a water-reducing agent in accordance with some embodiments of the present disclosure.
Figure 39:
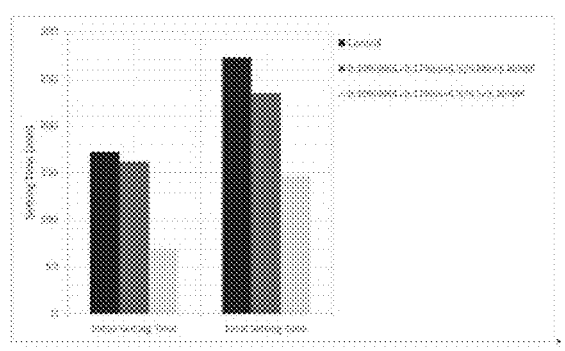
FIG. 39 is a graph illustrating the setting time of a printable cementitious composition including slag, silica fume, and a water-reducing agent in accordance with some embodiments of the present disclosure.
Figure 40:
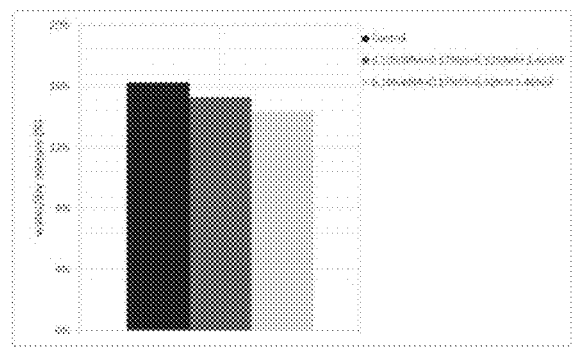
FIG. 40 is a graph illustrating water/dry mixture percentage of a printable cementitious composition including slag, silica fume, and a water-reducing agent in accordance with some embodiments of the present disclosure.
Figure 41:
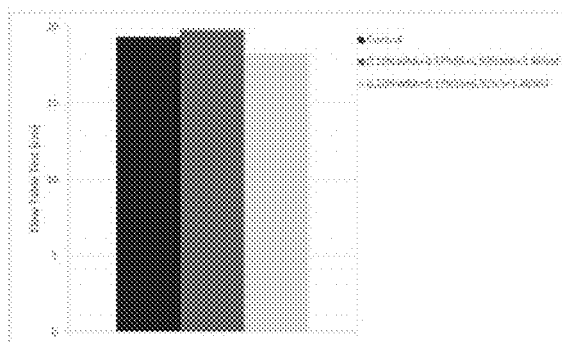
FIG. 41 is a graph illustrating a flow table test of a printable cementitious composition including slag, silica fume, and a water-reducing agent in accordance with some embodiments of the present disclosure.
Figure 42:
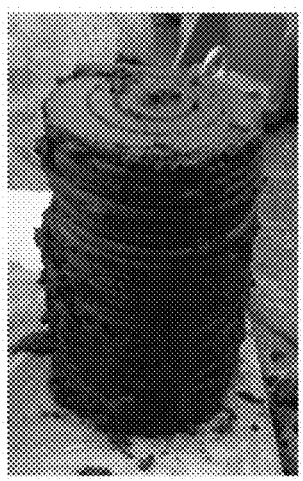
FIG. 42 is an image of a printed cylinder using a printable cementitious material in accordance with some embodiments of the present disclosure.
Figure 43:
FIG. 43 is an image of a printed cylinder using a printable cementitious material in accordance with some embodiments of the present disclosure.
Figure 44:
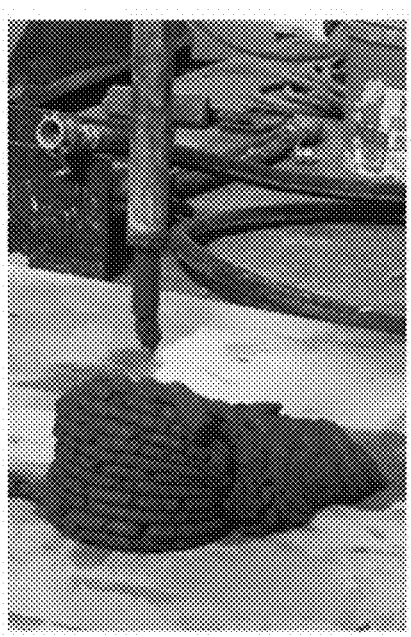
FIG. 44 is an image of a printed cylinder using a printable cementitious material in accordance with some embodiments of the present disclosure.
Figure 45:
FIG. 45 is an image of a printed cylinder using a printable cementitious material in accordance with some embodiments of the present disclosure.

Tilcon may be used as an aggregate for M1. FIG. 25 displays the size distribution of Tilcon aggregate. Tilcon was dried at 110° C. for 48 hours and then sieved with a #16 sieve (1.18 mm). Incorporating Tilcon aggregate into the cementitious mixtures resulted in increased strength. Incorporating Tilcon into the wet mixture caused heating during the pumping process due to the coarse aggregate.

Har Tru may be used as an aggregate for M2-M25. FIG. 25 displays the gradation of Har Tru. Test results of using Tilcon and Har Tru in the cementitious materials M1 and M2 are also shown and compared in FIGS. 26-29. It is notable that there were no other significant differences between the settings of these two aggregates. The effect of aggregate content is shown in FIGS. 30-33 in connection with cementitious materials M4 and M7. The Har Tru aggregate content consisted of 54% and 59% of the total mixture (weight percentage). Based on FIGS. 30-33, increasing the aggregate content improves the strength of the material by up to 76%. The addition of more aggregate in the cement mixture could also enhances the yield stress and buildability of fresh material, but also lower the viscosity and impact the flowability and pumpability of the fresh mixture. The addition of excessive amounts of aggregate may result in cracking of freshly extruded concrete (since the cement paste content is low to bind the aggregate properly and homogenize the matrix). In one embodiment, crack formation of extruded object may include aggregate content of less than 55%.

Clay

A 6×12 inch cylinder was printed to test the printability of designed mixtures. For most of the designed mixture, the cylinder was cracked during extrusion, and the printing quality of the final object was not acceptable. Adding nanoclay surprisingly and unexpectedly improved the workability of the material and helped to print a neat and high-quality cylinder, but it did not reduce its buildability.

Exemplary Admixtures

FIGS. 34-37 show a cementitious composition comprising MK, SF, WRA, and no accelerator. FIGS. 34-37 are a comparison of M2, M10, and M12 results. FIGS. 38-41 show a cementitious composition comprising S, SF, WRA with an accelerator. FIGS. 38-41 are a comparison of M13, M15, and M16 results. Cementitious materials comprising MK, SF, WRA, as well as S, SF, and WRA are prepared and compared. FIGS. 34-41 illustrate the mixtures containing slag resulted in a larger strength but a shorter setting time.

Printed Three-Dimensional Structure—Cylinders

Mixtures M14, M16, M22, and M24 are printed to form 6×12 inch cylinders. FIGS. 42-45 illustrate the printed cylinder. As it can be seen, M22 resulted in a buckling failure in the printed mixture. M14 and M16 resulted in moderate-quality prints having unsmooth surfaces, along with cracks and tears in the outer surface. M24 achieved the best results having excellent print quality and buildability. The surprising and unexpected results of M24 are attributed, in part, to the incorporation of nanoclay, which is absent from the other mixtures.

Table 3 illustrates the results of a 2-day compressive strength test of M16 and M24.

TABLE 3

Results of 2-day Compressive Strength Test

| Mix ID | Load (KN) | Strength (MPa) |
|---|---|---|
| M16 | 307.06 | 13.11 |
| M24 | 383.08 | 20.48 |

Freeze and Thaw test of M16 was also performed, and its results are presented in Table 4. For this test, three specimens (prisms) were printed and tested according to ASTM C666. The prisms were produced by 3D-printing and were assigned RJLG identification numbers as indicated in Table 4. The as-received specimens were irregular shaped and larger than the specified dimensions. The prisms were cut to a nominal size of 4×3×16 inches and were conditioned in lime water for testing. Resonant frequency (dynamic modulus) and mass change properties were monitored and calculated at intervals no greater than 35 cycles to a maximum of 150 cycles.

The results of the durability factor (DF) according to ASTM C666 is presented for each specimen in Table 4. The durability factor for each sample is calculated by multiplying the final relative dynamic modulus of elasticity by the number of cycles completed and dividing that by the specified number of cycles, which is 150. As the $DF_{ave}$ is between 40 and 60, this material would be durable under freezing and thawing conditions.

TABLE 4

Samples Received and Prepared for ASTM 666 Testing.

| Sample ID | Length (mm) | Width (mm) | Height (mm) | Mass (g) | No. of Cycles | DF |
|---|---|---|---|---|---|---|
| 3155588 | 405 | 101 | 76 | 6739 | 93 | 59 |
| 3155589 | 405 | 100 | 71 | 6277 | 93 | 56 |
| 3155590 | 392 | 100 | 73 | 6132 | 93 | 53 |

Selected Results

In some embodiments, certain of the example cementitious compositions may be advantageous in connection with 3D-printing. For example, M25 may be considered because one of the ingredients used in M24 (i.e., CC) may not be cost effective for a particular application. However, using SS may also accelerate the setting time and may replace CC in M24. M25 may be considered as a more cost effective mixture, yet may have a lower strength as compared to M24. For practical applications, using M24 for 3-D printing of high performance concrete (HPC) may be beneficial, while use of M25 for 3-D printing of ordinary concrete used in regular construction may be beneficial.

Printed Beams

Figure 46:
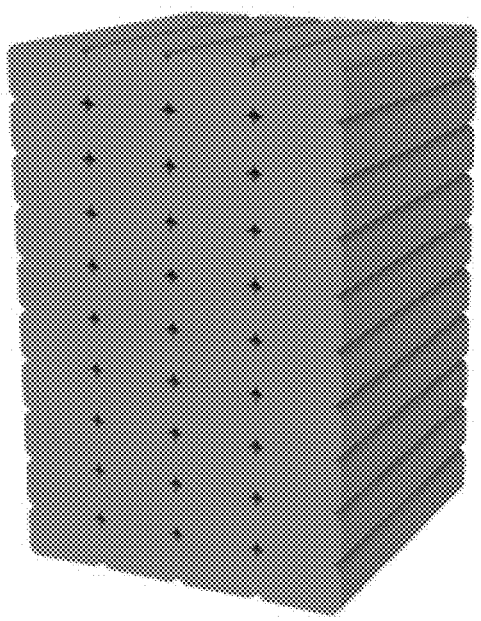
FIG. 46 illustrates an exemplary printed filament orientation without reinforcement members in accordance with some embodiments of the present disclosure.
Figure 47:
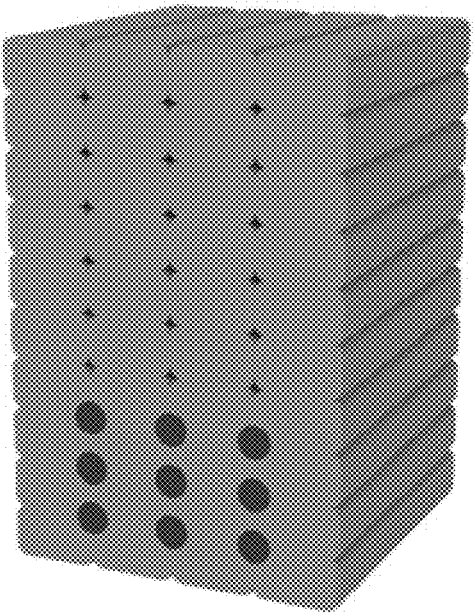
FIG. 47 illustrates an exemplary printed filament orientation with reinforcement members in accordance with some embodiments of the present disclosure.

Three-dimensional printed beams were produced using the M25 mixture, and the flexural strength was determined of the beam. The flexural tests were repeated at least 3 times to establish a mean and standard deviation. FIGS. 46 and 47 show the cross section of printed beams. Printing set-up parameters: pumping rate: 3.16 lit/min (Dial 7), nozzle size: 1 inch (25.4 mm), water flow rate: 850 Kg/hour, robot speed: 210 mm/sec (67%-75% of 300 mm/sec), and nozzle distance to bed of 15 mm. The temperature was 25° C. and humidity was 69%. FIG. 46 illustrates the printed beam pattern without reinforcement members (S51) and with reinforcement members (S55) and illustrated as dots in FIG. 47. In one example embodiment, the reinforcement members may comprise barbed wires (e.g., 27 total wires).

For the printing process, the water pressure was set to establish a desired consistency and workability of fresh material, then the extrusion speed was adjusted based on the pump pressure (dial 7) to assure the printing is not over or under extrusion and minimize the formation of voids between the filaments. All of the barbed wires were cut firstly to a desired length (130 mm), straightened by twisting them, and then manually placing them at different layers of S55 beams (FIG. 47). 3D-printed beams were cured for 24 hours by spraying water and covering the specimen with a polyethylene plastic shroud for the first 24 hours.

The depth and width of each beam were measured at three different points (close to the supports and at the mid-length of the beam). Maximum bending load, deformation, and module of rupture (MOR) are displayed in Table 5.

S51 beams experienced a brittle and acute flexural failure, which is characterized by splitting of concrete at mid-length of the beam because of lack of any reinforcement. This failure happened without any warning and cracks. The maximum flexural stress at failure for these plain beams is 3.11 MPa, which shows an increase of 21% compared to flexural strength of plain beam made of a Gulf Concrete Technology (GCT Concrete) mixture. GCT is a ready and sprayable mortar mixture, which is mainly designed for prefabrication of concrete components or spraying or hand-troweling on the surfaces of walls or floors. The product contains fine aggregates for finishing Specimens S55 also experienced a flexural-shear failure. The barbed wire reinforced beams with M1 concrete showed larger load resistance in these beams. More specifically, the S55 beams showed maximum stress resistance or MOR of 12.88 MPa, which is 11% larger than similar beams made of GCT.

TABLE 5

Flexural test results of 3D-printed beams made of M1 (PSU mixture)

| Beam # | | Width (mm) (3 points) | Ave. | Depth (mm) (3 points) | Ave. | Length (mm) (between supports) | As (mm²) | Max Load (KN) | Max Deformation (mm) | Maximum Flexural Stress or MOR (MPa) | |
|---|---|---|---|---|---|---|---|---|---|---|---|
| S51 | 1 | 104 | 104 | 145 | 145 | 1000 | 0.00 | 4.83 | 0.99 | 3.30 | 3.11 |
| | | 104 | | 149 | | | | | | | |
| | | 105 | | 141 | | | | | | | |
| | 2 | 105 | 109 | 152 | 151 | 1000 | | 4.79 | 0.53 | 2.91 | |
| | | 110 | | 150 | | | | | | | |
| | | 111 | | 150 | | | | | | | |

TABLE 5-continued

Flexural test results of 3D-printed beams made of M1 (PSU mixture)

| Beam # | | Width (mm) (3 points) | Ave. | Depth (mm) (3 points) | Ave. | Length (mm) (between supports) | As (mm²) | Max Load (KN) | Max Deformation (mm) | Maximum Flexural Stress or MOR (MPa) | |
|---|---|---|---|---|---|---|---|---|---|---|---|
| | 3 | 108 | 110 | 147 | 146 | 1000 | | 4.89 | 0.28 | 3.11 | |
| | | 109 | | 147 | | | | | | | |
| | | 115 | | 144 | | | | | | | |
| S55 | 1 | 108 | 109 | 150 | 149 | 1000 | 53.01 | 20.61 | 5.77 | 12.81 | 12.88 |
| | | 110 | | 148 | | | | | | | |
| | | 111 | | 147 | | | | | | | |
| | 2 | 112 | 108 | 149 | 149 | 1000 | | 18.78 | 6.15 | 11.72 | |
| | | 107 | | 148 | | | | | | | |
| | | 107 | | 150 | | | | | | | |
| | 3 | 104 | 106 | 146 | 146 | 1000 | | 21.20 | 9.40 | 14.12 | |
| | | 106 | | 148 | | | | | | | |
| | | 107 | | 144 | | | | | | | |

Elastic Modulus and Compressive Strength Tests

Figure 48:
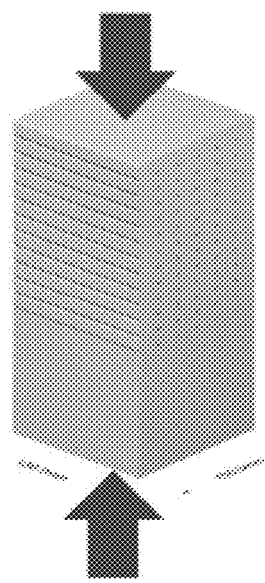
FIG. 48 illustrates a perpendicular testing direction for compressive strength tests of the printed cubic prisms.
Figure 49:
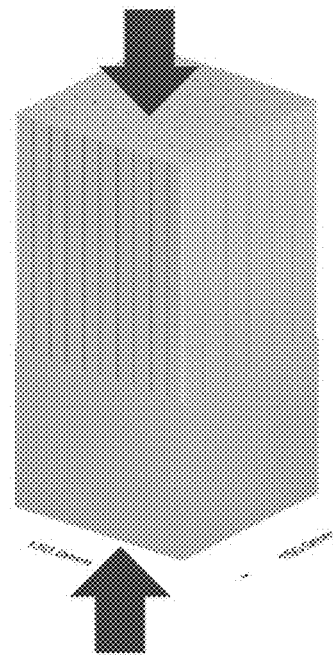
FIG. 49 illustrates a longitudinal testing direction for compressive strength tests of the printed cubic prisms.

The structural response of the printed material under different loading direction and compressive strength tests were performed. A cubic prism (150 mm×150 mm×300 mm) was printed with a square cross section. To study the effect of tool path on the structural response of the printed material, two different printing paths were designed. In tool path #1, the filament direction is perpendicular to the compressive strength direction, while in the second tool path the filament direction is perpendicular to the pressure direction as it can be seen in FIGS. 48-49. The compressive strength test may be repeated at least 3 times to establish a mean and standard deviation. A coordinate system XYZ is described where the directions of the X- and Z-axis are parallel to the printing path (dashed lines) and the gravitational direction (the height during the printing process), respectively. Printed layers locate in the X-Y plane.

The printed specimens were cut by tin plates into the desired dimension while the material was fresh. The samples were cured for 24 hours by spraying water and covering them with plastic sheets. Since the measurement of the static modulus needs smooth surface, all 6 sides of prisms after 7 days of 3D-printing were grinded and as such the size of 3D-printed specimens was reduced to 120×120×240 mm prisms. Additionally, three cubic prisms were also cast in place and grinded to the size of 100×100×200 mm.

Compression testing of square prismatic samples was performed to determine the elastic modulus values of two different 3D printed concrete materials. The M25 mixture was tested, which is an example that is appropriate for use in 3D printing of concrete. To have a basis for comparison, a mixture designed by the company Gulf Concrete Technology (GCT Concrete), which is marketed as a mortar mixture, was used. This mixture may be used when a large volume of concrete is needed for printing.

The GCT mixture design also consists of Portland cement as its main ingredient. The GCT concrete has a more extended setting (hardening) time than the M25 mixture, which allows the printing process to have more open time for the stop during its printing process. Also compared to GCT concrete, the M25 mixture has slightly higher ultimate strength, which gives more structural capacity of the printed components. Both materials have an accelerator additive that helps to realize the desirable hardened strength of an extruded bead at the intended time, so the bead holds its shape while the next layer is extruded above it.

Figure 50:
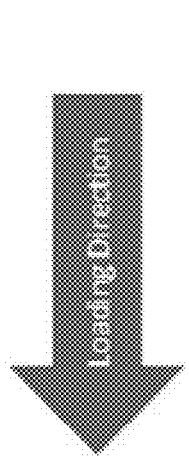
FIG. 50 illustrates the orientation of the compressive loading and direction of the beads in the specimens; in the sample ID names, V means the direction of the beads is parallel to the loading direction (Vij, Left), while H means the direction of the beads is perpendicular to the loading direction (Hij, Right).
Figure 50:
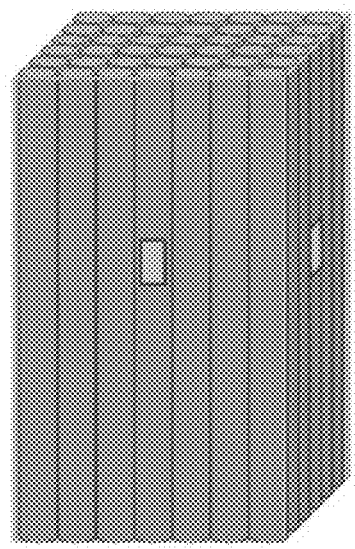
Figure 50:
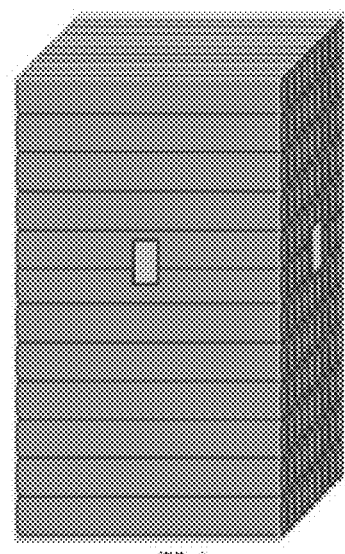

The compressive testing to determine the ultimate compressive strength of the samples was carried out by using the Boart Longyear loading frame Model CM-625 with a CSI Model CS-100-2A Retrofit material testing machine with a capacity of 400 Kips in CITEL (lab). Based on the ultimate strength of each sample, the elastic stress range at 40% of the ultimate value for the specimens was determined for the strain-stress measurement testing as shown at Table 6. The character V and H stand for the orientation of the toolpath pattern for the specimen as shown in FIG. 50, while i (the first number) represents the material type, 1 for GCT, and 2 for the M25 mixture, and j (the second number) shows the sample number of each sample case.

TABLE 6

Measured ultimate compressive strength and calculated elastic range compression for each specimen cases

| | Ultimate Compressive Strength | | 40% of Ultimate Compressive Strength | |
|---|---|---|---|---|
| Case | lbs (kN) | psi (MPa) | lbs (kN) | psi (MPa) |
| V11 | 130,350 (579.83) | 5,614 (38.71) | 52,140 (231.93) | 2,246 (15.48) |
| V2* | 79,485 (353.57) | 3,585 (24.72) | 28,294 (141.43) | 1,434 (9.89) |
| H11 | 89,130 (383.13) | 3,807 (26.25) | 35,652 (158.59) | 1,523 (10.50) |
| H21 | 66,130 (294.16) | 2,872 (19.80) | 26,452 (117.66) | 1,149 (7.92) |
| C1 | 108,200 (481.30) | 8,283 (57.11) | 43,280 (192.52) | 3,313 (22.84) |

*The value for sample case V2 is the averaged of sample cases V21 and V22

The samples for the compressive loading test to measure the strain-stress relationship were prepared by attaching electronic strain gauges (ESG) on the center location of each side surfaces. Additional polishing work was done for securing the bond strength between the ESG and the sample surface. The epoxy adhesive provided by the ESG's manufacturer was applied to the strain measuring locations. The sample surfaces were neutralized to prevent the interaction of epoxy's acidity on the sample surfaces. Applying the epoxy on the sample surface and polishing the surface fills the microvoids on the sample surfaces to increase and enhance the quality of the attachment of the ESGs to the samples' surfaces. Then, the ESGs have adhered to the locations marked for measurement.

The stress-strain data were obtained by measuring the compressive loading obtained from the MTS Universal testing machine and strains from the ESGs. Due to the capacity limitation of the MTS machine, the ultimate compressive load capacity was determined using another machine, as noted above with results shown in Table 6. Then 40% of the ultimate load (Table 6) was used as the upper bound of the linear-elastic portion of the stress-strain behavior, from which modulus of elasticity was determined.

Figure 51:
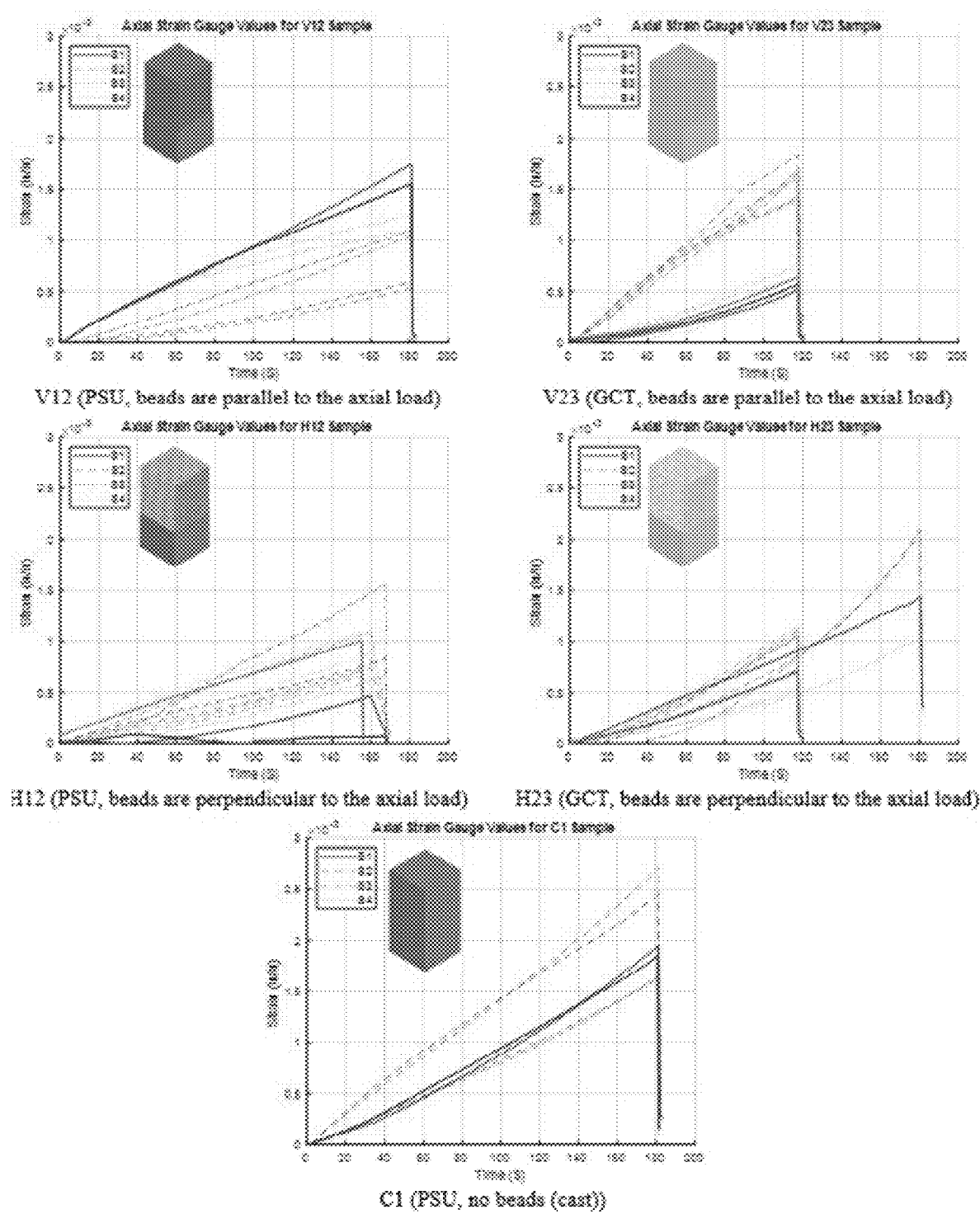
FIG. 51 illustrates graphs of axial strain-time history for the testing trial cases: V12 (top left) and V23 (top right), H12 (middle left) and H23 (middle right), C1 (bottom).

FIG. 51 shows strain increasing with time for each sample. The lines with different patterns of the same color indicate the strain in the strain gauges on the four perimeter faces of each sample. The figures also illustrate some differences in results between the repeated tests (shown by different colors). One explanation for such differences is that the sample's top and bottom surfaces were not perfectly parallel due to saw cutting, and this results in some eccentricity in the sample under compression. The variation of the dimensions of the samples as shown in Table 7 supports this explanation.

TABLE 7

Measured dimensions of the testing samples

| Sample # | | Width (mm) | | Depth (mm) | | Length (mm) | |
|---|---|---|---|---|---|---|---|
| | | (3 points) | Ave. | (3 points) | Ave. | (3 points) | Ave. |
| H2 | 1 | 121.30 | 122.05 | 122.78 | 121.74 | 240.00 | 240.00 |
| | | 122.35 | | 121.88 | | 240.00 | |
| | | 122.51 | | 120.55 | | 240.00 | |
| | 3 | 120.06 | 120.60 | 119.78 | 119.83 | 241.00 | 240.33 |
| | | 120.68 | | 119.84 | | 240.00 | |
| | | 121.05 | | 119.87 | | 240.00 | |
| V2 | 1 | 122.00 | 122.33 | 116.50 | 116.83 | 239.50 | 239.50 |
| | | 122.00 | | 117.00 | | 240.00 | |
| | | 123.00 | | 117.00 | | 239.00 | |

TABLE 7-continued

Measured dimensions of the testing samples

| Sample # | | Width (mm) | | Depth (mm) | | Length (mm) | |
|---|---|---|---|---|---|---|---|
| | | (3 points) | Ave. | (3 points) | Ave. | (3 points) | Ave. |
| | 2 | 119.00 | 119.00 | 120.00 | 120.33 | 240.50 | 241.00 |
| | | 119.00 | | 120.50 | | 241.00 | |
| | | 119.00 | | 120.50 | | 241.50 | |
| | 3 | 119.25 | 120.01 | 118.80 | 119.09 | 241.00 | 240.33 |
| | | 120.26 | | 119.32 | | 240.00 | |
| | | 120.51 | | 119.15 | | 240.00 | |

Figure 52:
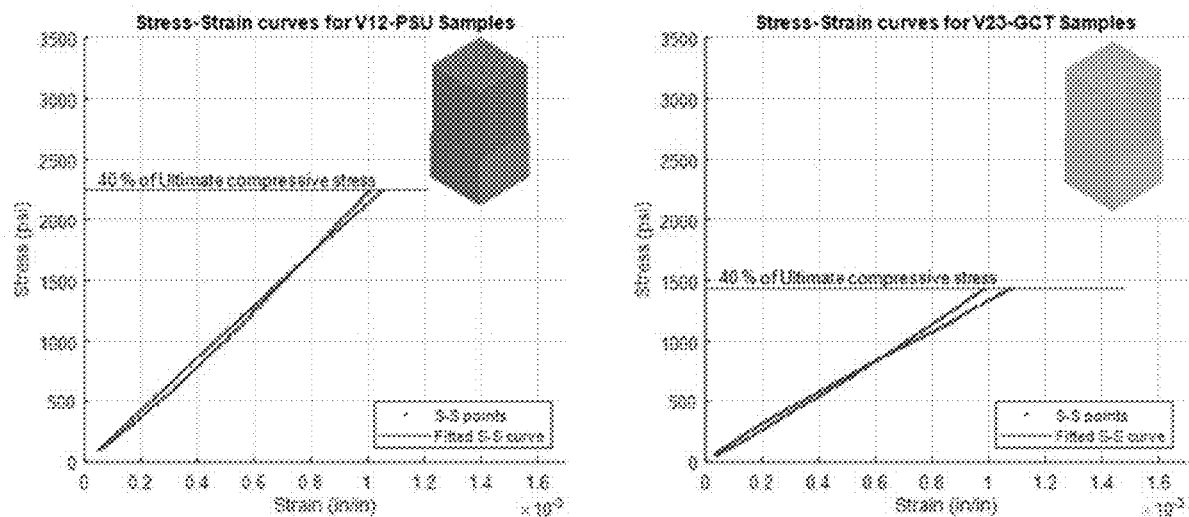
FIG. 52 illustrates graphs of regressed stress-strain curves and the secant modulus of elasticity graph by the elastic range (40% of ultimate strength); two repetition testing result of V12 sample with PSU material (left) and two repetitions testing result of V23 sample with GCT material (right).
Figure 53:
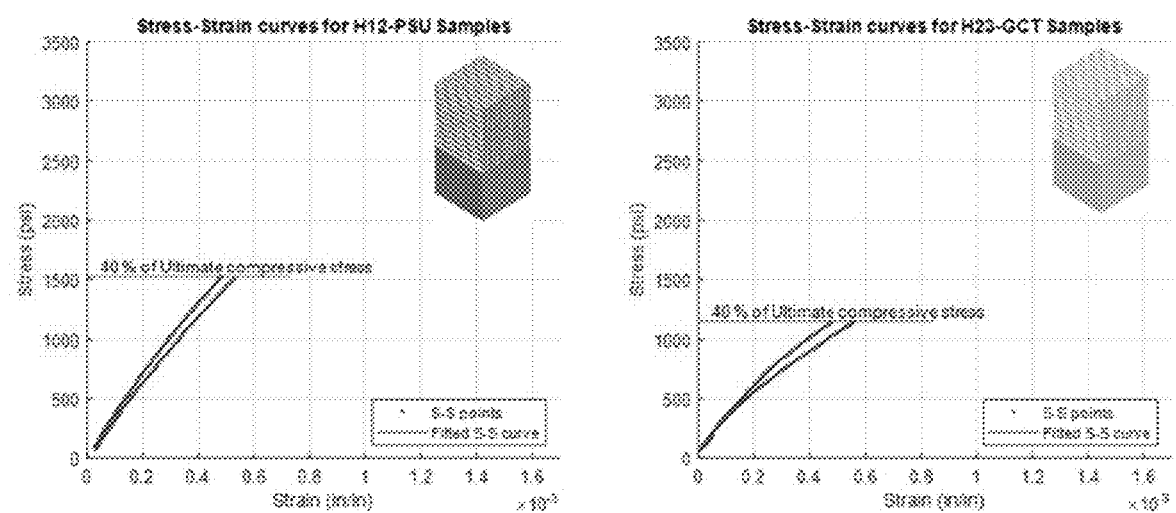
FIG. 53 illustrates graphs of regressed stress-strain curves plotted up to the elastic range (40% of ultimate strength)

The normal stress due to compressive loading was calculated by dividing the applied compressive load by the cross-section area of the sample where the ESG was located. Then the strain values corresponding to the compressive stress were calculated by averaging the four strain values in the sample's longitudinal direction. The strain measurement location is the center of the four perimeter surfaces of the sample where the strain effectively represents the whole sample body's axial deformation. The strain and stress values with the same time-stamp are plotted as shown in FIGS. 52-54.

The test results of H12 and H23 samples show slightly more nonlinearity in their strain-stress relationship compared to the other samples. One explanation for this is that the horizontally oriented stacked beads with some degree of a cold joint (due to the open time during the 3D printing process) experienced slightly larger deformation compared to the vertically oriented beads under compression, and thus show slightly more nonlinear behavior of the sample.

Furthermore, this caused more lateral deformation due to enhanced Poisson Effect of the horizontally oriented beads as shown in FIG. 55. The relatively converged secant elastic modulus (2.15~2.60×106 psi) of the case samples C1 compared to the other testing cases also support the explanation that there is additional mesoscale deformation in the sample. While the stress-strain relation for H12 and H23 show slightly more curved diagram, which shows some softening along the path from zero to 40% ultimate loading, comparison with V12 and V23 shows that latter actually leads to slightly smaller modulus although the stress-strain relation is more linear.

The averaged secant modulus of elasticity of both repeated testing trials is shown in the following Table 8. The modulus of elasticity may be calculated as shown in Equation 1 for normal weight concrete or Equation 2 or general concrete whose weight is in the range between 90 and 160 lb/ft$^3$.

$$E_c = 57000\sqrt{f'_c} \text{(in psi)} \quad \text{Equation 1}$$

$$E_c = w_c^{1.5} 33\sqrt{f'_c} \text{(in psi)} \quad \text{Equation 2}$$

TABLE 8

Secant modulus of elasticity and the derived ultimate compressive strength based on the testing result for all sample cases

| Case | | Secant Modulus of Elasticity at 40% at the Ultimate Strength, ksi (MPa) | Derived Ultimate Compressive Strength, psi (MPa), $w_c$ = 103 lb/ft$^3$ | | Measured Ultimate Compressive Strength, psi (MPa) |
|---|---|---|---|---|---|
| | | | $E_c = 57000\sqrt{f'_c}$ (in psi) | $E_c = w_c^{1.5}\sqrt{f'_c}$ (in psi) | |
| V12 | 1st | 2,139 (14,748) | 1,408 (9.71) | 3,831 (26.41) | 5,614 (38.71) |
| | 2nd | 2,223 (15,327) | 1,520 (10.48) | 4,135 (28.51) | |
| V23 | 1st | 1,317 (9,080) | 534 (3.68) | 1,452 (10.01) | 3,586 (24.72) |
| | 2nd | 1,445 (9,963) | 643 (4.43) | 1,748 (12.05) | |

TABLE 8-continued

Secant modulus of elasticity and the derived ultimate compressive strength based on the testing result for all sample cases

| Case | | Secant Modulus of Elasticity at 40% at the Ultimate Strength, ksi (MPa) | Derived Ultimate Compressive Strength, psi (MPa), $w_c$ = 103 lb/ft³ | | Measured Ultimate Compressive Strength, psi (MPa) |
|---|---|---|---|---|---|
| | | | $E_c = 57000\sqrt{f'_c}$ (in psi) | $E_c = w_c^{1.5}\sqrt{f'_c}$ (in psi) | |
| H12 | 1st | 2,893 (19,947) | 2,575 (17.75) | 7,004 (48.29) | 3,807 (26.25) |
| | 2nd | 3,190 (21,994) | 3,132 (21.59) | 8,520 (58.74) | |
| H23 | 1st | 2,438 (16,809) | 1,830 (12.62) | 4,977 (34.32) | 2,872 (19.80) |
| | 2nd | 2,037 (14,045) | 1,277 (8.81) | 3,472 (23.94) | |
| C1 | 1st | 2,151 (14,831) | 1,423 (9.81) | 3,872 (26.70) | 8,283 (57.11) |
| | 2nd | 2,164 (14,920) | 1,442 (9.94) | 3,921 (27.03) | |

The modulus of elasticity of the material calculated from plugging the ultimate compressive strength in Equations 2 and 3 shows that the modulus of elasticity from the testing result falls between the values from the two equations. For the use of Equation 2, the unit weight of hardened concrete was assumed 103 lb/ft³ (1.7 g/cm3). The guidance of ACI 318-14 requires the measured elastic modulus values to be within the range from 80 to 120 percent of calculated values. Based on the values shown in Table 8, only the results of test H12 satisfies this condition when compared to the results of Eq. 2. It is interesting to note that even the cast samples do not satisfy this guideline. One reason is that the concrete used here is more like mortar, and not conventional concrete that includes aggregates.

Specimens of horizontal tool-path orientation tend to have higher elastic modulus values than the specimens of vertical orientation since the inclination of H12 is higher than of V12 samples as shown in FIG. 56. On the other hand, it is observed that the samples with the M25 mixture have higher stiffness since the inclination of the stress-strain curves of the M25 mixture samples is steeper than the inclination of GCT concrete samples as shown in FIG. 57.

The invention has been described according to one or more preferred embodiments, and it should be appreciated that many equivalents, alternatives, variations, and modifications, aside from those expressly stated, are possible and within the scope of the invention.

We claim:

1. A printable cementitious composition comprising:
   (i) from 20 wt % to 40 wt % of a cement binder;
   (ii) from 30 wt % to 50 wt % of an aggregate;
   (iii) from 5 wt % to 15 wt % of at least one pozzolanic additive;
   (iv) from 0.1 wt % to 1.5 wt % of an accelerator;
   (v) from 10 wt % to 20 wt % of water; and
   (vi) from 0.01 wt % to 2 wt % of a nanoclay.

2. The printable cementitious composition of claim 1 comprising from 25 wt % to 40 wt % of the cement binder, based on the total weight of the printable cementitious composition.

3. The printable cementitious composition of claim 2, wherein the cement binder is ordinary portland cement.

4. The printable cementitious composition of claim 1 comprising from 35 wt % to 45 wt % of the aggregate, based on the total weight of the printable cementitious composition.

5. The printable composition of claim 1, wherein the aggregate has a particle size of less than 2.0 mm.

6. The printable composition of claim 1 comprising from 5 wt % to 13 wt % of the at least one pozzolanic additive, based on the total weight of the printable cementitious composition.

7. The printable composition of claim 1, wherein the at least one pozzolanic additive is selected from the group consisting of silica fume, slag, metakaolin, and combinations thereof.

8. The printable composition of claim 1, wherein the at least one pozzolanic additive includes:
   from 0.5 wt % to 5 wt % silica fume, based on the total weight of the printable composition;
   from 1 wt % to 20 wt % slag, based on the total weight of the printable composition, and
   from 0.5 wt % to 6 wt % metakaolin, based on the total weight of the printable composition.

9. The printable composition of claim 1 comprising from 0.2 wt % to 1.5 wt % of the accelerator, based on the total weight of the printable composition.

10. The printable composition of claim 1, wherein the accelerator is selected from the group consisting of calcium chloride, sodium metasilicate, and combinations thereof.

11. The printable composition of claim 1 further comprising a water-reducing agent.

12. The printable composition of claim 11 comprising from 0.01 wt % to 1 wt % of the water-reducing agent, based on the total weight of the printable composition.

13. The printable composition of claim 1 comprising from 10 to 14 wt % water, based on the total weight of the printable composition.

14. The printable composition of claim 1 comprising from 0.01 wt % to 1 wt % nanoclay, based on the total weight of the printable composition.

15. The printable composition of claim 1, wherein the nanoclay is selected from the group consisting of montmorillonite, bentonite, kaolinite, hectorite, and hallysite.

16. The printable composition of claim 1 comprising one or more of the following properties:
   (a) a flow table test from 15 cm to 20 cm;
   (b) an initial set time from 50 to 180 minutes;
   (c) a final set time from 80 to 300 minutes;
   (d) a fresh density from 2.0 to 2.4 g/cm³;
   (e) a 2-day strength from 10 MPa to 55 MPa; or
   (f) a 28-day strength from 25 MPa to 85 MPa.

17. The printable composition of claim 1 comprising all of the following properties:
   (a) a flow table test from 15 cm to 20 cm;
   (b) an initial set time from 50 to 180 minutes;

(c) a final set time from 80 to 300 minutes;
(d) a fresh density from 2.0 to 2.4 g/cm$^3$;
(e) a 2-day strength from 10 MPa to 55 MPa; or
(f) a 28-day strength from 25 MPa to 85 MPa.

18. The printable composition of claim 1, wherein
the aggregate is a basalt,
the at least one pozzolanic additive comprises silica fume and slag, and
the accelerator is sodium metasilicate.

19. A method comprising:
(i) depositing a first filament of a cementitious material on a printing surface from a nozzle of a print head, wherein the cementitious material comprises from 20 wt % to 40 wt % of a cement binder, from 30 wt % to 50 wt % of an aggregate, from 5 wt % to 15 wt % of at least one pozzolanic additive, from 0.1 wt % to 1.5 wt % of an accelerator, from 10 wt % to 20 wt % of water, and from 0.01 wt % to 2 wt % of a nanoclay; and
(ii) depositing at least one additional filament of the cementitious material atop the first filament thereby forming a three-dimensional structure.

20. A printable cementitious composition comprising:
(i) a cement binder;
(ii) an aggregate;
iii) at least one pozzolanic additive that includes, based on the total weight of the printable composition, from 0.5 wt % to 5 wt % silica fume, from 1 wt % to 20 wt % slag, and from 0.5 wt % to 6 wt % metakaolin;
(iv) an accelerator;
(v) water; and
(vi) nanoclay.

* * * * *